(12) United States Patent
Mohajerin et al.

(10) Patent No.: US 11,465,633 B2
(45) Date of Patent: Oct. 11, 2022

(54) METHOD AND SYSTEM FOR GENERATING PREDICTED OCCUPANCY GRID MAPS

(71) Applicants: Nima Mohajerin, Toronto (CA); Mohsen Rohani, Gatineau (CA)

(72) Inventors: Nima Mohajerin, Toronto (CA); Mohsen Rohani, Gatineau (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 356 days.

(21) Appl. No.: 16/509,045

(22) Filed: Jul. 11, 2019

(65) Prior Publication Data

US 2020/0148215 A1 May 14, 2020

Related U.S. Application Data

(60) Provisional application No. 62/767,309, filed on Nov. 14, 2018.

(51) Int. Cl.
*B60W 50/00* (2006.01)
*G06N 3/04* (2006.01)
(Continued)

(52) U.S. Cl.
CPC ....... *B60W 50/0097* (2013.01); *G05D 1/0088* (2013.01); *G06N 3/0445* (2013.01);
(Continued)

(58) Field of Classification Search
CPC ........ B60W 50/0097; G06T 7/50; G06T 5/30; G06T 15/40; G06K 9/6282; G05D 1/0214;
(Continued)

(56) References Cited

U.S. PATENT DOCUMENTS

| 11,016,491 B1 * | 5/2021 | Millard | G05D 1/0214 |
| 2012/0087556 A1 * | 4/2012 | Dai | G06K 9/6282 |
| | | | 382/128 |

(Continued)

FOREIGN PATENT DOCUMENTS

| CN | 101000507 A | * | 7/2007 | ............... G05D 1/02 |
| CN | 104657740 A | * | 5/2015 | ............ G06F 30/20 |

(Continued)

OTHER PUBLICATIONS

Cho Kyunghyun [et al.] On the properties of neural machine translation: Encoder-decoder approaches [Journal].—[s..] : arXiv preprint arXiv:1409.1259 , 2014 2014.

(Continued)

*Primary Examiner* — Yuri Kan

(57) ABSTRACT

Methods and systems for generating a predicted occupancy grid map (OGM) over at least one future time step are described. The system include a first encoder for extracting OGM features from an input OGM in a current time step. The system also includes a recurrent neural network for generating a corrective term from at least the OGM features, wherein the corrective term represents predicted change to the input OGM, and wherein the corrective term is applied to the input OGM to generate a corrected OGM. The corrected OGM represents features corresponding to occupancy of the environment in a first future time step. The system also includes a classifier for converting the corrected OGM to the predicted OGM for the first future time step. The predicted OGM is fed back as input for performing generating a predicted OGM for a second future time step.

20 Claims, 9 Drawing Sheets

(51) Int. Cl.
  *G05D 1/00* (2006.01)
  *G05D 1/02* (2020.01)
(52) U.S. Cl.
  CPC ......... *G05D 1/0231* (2013.01); *G05D 1/0257* (2013.01); *G05D 1/0278* (2013.01)
(58) Field of Classification Search
  CPC .......... G05D 1/02; G05D 1/0088; H04Q 7/24; G01C 21/32; G05B 19/042; G06F 30/20; G06N 3/08
  See application file for complete search history.

(56) References Cited

U.S. PATENT DOCUMENTS

| | | | | |
|---|---|---|---|---|
| 2018/0012370 | A1* | 1/2018 | Aghamohammadi | .... G06T 7/50 |
| 2018/0307245 | A1 | 10/2018 | Khawaja et al. | |

FOREIGN PATENT DOCUMENTS

| | | | | | |
|---|---|---|---|---|---|
| CN | 106441319 | A | | 2/2017 | |
| CN | 106503236 | A | * | 3/2017 | ................ G06N 3/08 |
| CN | 107544330 | A | * | 1/2018 | ............ G05B 19/042 |
| CN | 108709562 | A | * | 10/2018 | .............. G01C 21/32 |
| KR | 20060038837 | A | * | 5/2006 | ................ H04Q 7/24 |
| WO | WO-2006003268 | A1 | * | 1/2006 | .............. G06T 15/40 |
| WO | WO-2009064172 | A1 | * | 5/2009 | ................ G06T 5/30 |
| WO | 2017124584 | A1 | | 7/2017 | |

OTHER PUBLICATIONS

Dequaire Julie [et al.] Deep tracking in the wild: End-to-end tracking using recurrent neural networks [Journal] // The International Journal of Robotics Research—2017.—vol. 37—pp. 495-512. 2017.

Farnebäck Gunnar Two-frame motion estimation based on polynomial expansion [Conference] // Scandinavian conference on Image analysis.—Berlin, Heidelberg : Springer, 2003. 2003.

Hochreiter Sepp and Schmidhuber Jurgen Long short-term memory [Article] // Neural Computation.—1997.—9.—vol. 8. 1997.

Hyeonwoo Noh, Hong Seunghoon and Han Bohyung Learning deconvolution network for semantic segmentation. [Conference] // IEEE international conference on computer vision.—[s.l.] : IEEE, 2015. 2015.

Jaderberg Max, Simonyan Karen and Zisserman Andrew Spatial Transformer Networks [Journal] // Advances in neural information processing systems.—2015.—pp. 2017-2025. 2015.

Nico Engel [et al.] Deep Object Tracking on Dynamic Occupancy Grid Maps Using RNNs [Journal].—[s.l.] : arXiv preprint arXiv:1805.08986, 2018. 2018.

Nuss Dominik [et al.] A random finite set approach for dynamic occupancy grid maps with real-time application [Journal].—[s.l.] : arXiv preprint arXiv:1605.02406, 2016. 2016.

Stumper Daniel [et al.] Offline Object Extraction from Dynamic Occupancy Grid Map Sequences [Journal].—[s.l.] : arXiv preprint arXiv:1804.03933, 2018 2018.

https://towardsdatascience.com/recurrent-neural-networks-d4642c9bc7ce 2018.

Jeon Hyeong Seok et al: .Traffic Scene Prediction via Deep Learning: Introduction of Multi Channel Occupancy Gr Map as aScene Representation 2018 IEEE Intelligent Vehicles Symposium(IU) IEEE Jun. 26, 2018 (Jun. 26, 2018) pp. 1496 1501 XP033423466.

* cited by examiner

METHOD AND SYSTEM FOR GENERATING PREDICTED OCCUPANCY GRID MAPS

CROSS-REFERENCE TO RELATED APPLICATIONS

The present disclosure claims priority from U.S. provisional patent application No. 62/767,309, entitled "METHOD AND SYSTEM FOR GENERATING PREDICTED OCCUPANCY GRID MAPS" and filed Nov. 14, 2018, the entirety of which is hereby incorporated by reference.

FIELD

The present disclosure relates to methods and systems for providing predictions used to generated predicted occupancy grid maps representing a dynamic and unstructured environment.

BACKGROUND

An autonomous device (e.g., autonomous vehicle) may use different sensors (e.g., sonar range finder, radar, LIDAR and/or camera, among others) to sense its surrounding environment. Information collected from the sensors is used for path planning and navigation of the autonomous device. In order to efficiently plan a path and safely navigate an autonomous device in any environment, it is important to have information about the position of any objects (both static and moving objects) in the environment. Occupancy Grid Maps (OGMs) are commonly used to represent the environment surrounding an autonomous device. An OGM may be generated from sensor data received from sensors of the autonomous device (also referred to as observations) and represented as a grid of cells. Each cell in the grid represents a physical space in the environment, and each cell contains a value representing the probability of each cell being occupied by an object, based on sensor data (e.g., observations) received from the sensors of the autonomous device.

For various reasons (e.g., sensor noise), the observations may not be fully clear. Therefore, the value contained in each cell is a value, typically between 0 and 1, that corresponds to how likely the cell is occupied by an object. The autonomous device can use the OGM (e.g., as input for path planning) to determine a path for the autonomous device to reach to a certain target or sweep a certain area inside the environment, for example. However, a single OGM may represent the environment at a given time point (specifically, the time at which the observations were obtained by the sensors). Therefore, the path planning performed using the OGM may be valid only if it is assumed that the environment is static. This assumption does not hold for a dynamic environment in which objects are moving and particularly in a dynamic, unstructured environment where the moving objects do not necessarily follow a predefined trajectory.

The environment surrounding an autonomous device is usually dynamic and unstructured. One way to cope with such an environment is to keep updating the OGM for each reading of sensor data (e.g., observation) and then update the planned path accordingly. However, this approach will result in frequent modifications to the autonomous device's planned trajectory, which may be unsafe and/or may require many unnecessary steering corrections. Another approach is to enlarge representations of objects in the OGM to account for their movement. In this approach, the cells surrounding objects are assumed to also be occupied, and path planning is performed based on the "enlarged" OGM. A difficulty with this approach is to how determine which of the cells surrounding objects are assumed to be occupied. Also, such an approach may not be suitable in a tight environment because otherwise free spaces that can be used would be blocked by the enlarged object representations in the OGM.

Accordingly, there is a need to provide an approach that is able to predict OGMs that take into account the dynamic nature of the surrounding environment and provide accurate and reliable OGMs that may be used for efficient and safe path planning.

SUMMARY

The present disclosure describes a methods and systems for generating, at each time step in a defined time period, a predicted OGM for a next future time step based on an input OGM for a current time step. The input OGM may be a historical observed or a previously predicted OGM. The generated predicted OGMs may provide accuracy and reliability that is sufficient for a planning system of an autonomous device to generate an efficient and safe planned path for the autonomous device. For the purposes of the present disclosure, an efficient planned path is a planned path with a minimum amount of steering and change in the state of the autonomous device (e.g., velocity, acceleration) to achieve a certain goal, such as a lane change.

In examples disclosed herein, a machine learning-based system (hereinafter "system") is described, which includes a neural network that can generate predicted OGMs for an environment surrounding a moving autonomous device (e.g., self-driving car). The disclosed system may include an encoder and decoder to handle large OGMs in acceptably short periods of time. In some examples, the disclosed system includes a recurrent neural network (RNN), which may be any suitable RNN. An example RNN may have gated recurrent units (GRUs), long-short-term memory (LSTM) layers, or other suitable neural network architectures. The disclosed system may be capable of generating predicted OGMs recursively. The disclosed system may generate a corrective term or compensation term for an input OGM and generate a predicted OGM by applying a classifier on the summation of the corrective term and the input OGM.

In some examples, the disclosed system uses reference map features and a motion-flow information to generate the corrective term or compensation term for the input OGM.

In some examples, the generated corrective term may be used to identify patterns useful for classifying dynamic vs. static objects or classic object detection and tracking algorithms.

Generally, the disclosed system may be capable of distinguishing between static and dynamic objects in the environment. The disclosed system may not require training using a labeled dataset comprising observed OGMs to generate predicted OGMs.

In accordance with a broad aspect, the present disclosure describes a system for generating predicted occupancy grid maps (OGMs) for an environment in which an autonomous vehicle is operating, the system comprising: a first encoder configured to receive, at each time step in a defined time period, an input OGM for a current time step in the defined time period and extract OGM features from the input OGM, the input OGM being one of an observed OGM for the current time step and a previously-predicted OGM for the current time step; a recurrent neural network configured to predict, at each time step in a defined time period, a corrective term based on the OGM features, wherein the corrective term represents predicted change to the input OGM, and wherein the corrective term is applied to the input OGM to generate a corrected OGM for a next time step in the defined time period, the corrected OGM representing features corresponding to occupancy of the environment in a next time step; and a classifier for converting the corrected OGM to a predicted OGM, the predicted OGM representing occupancy of the environment in the next time step.

In accordance with the preceding aspect, the system comprises a second encoder configured for extracting reference map features from a reference map, the reference map representing a priori information about the sensed environment. The recurrent neural network is configured to predict at each time step in a defined time period, the corrective term based on the OGM features and the reference map features.

In accordance with any of the preceding aspects, the system further comprises a motion-flow extractor for determining motion-flow between the input OGM and a previous OGM representing occupancy in a previous time step; and a third encoder for extracting motion-flow features from the motion-flow. The recurrent neural network is configured to predict, at each time step in a defined time period, the corrective term from the OGM features and the motion-flow features.

In accordance with any of the preceding aspects, the recurrent neural network is configured to predict, at each time step in a defined time period, the corrective term from the OGM features, the reference map features, and the motion-flow features.

In accordance with any of the preceding aspects, the first encoder is configured to reduce dimensionality of the OGM features.

In accordance with the preceding aspect, the system further comprises a decoder configured to increase a dimensionality of the corrective term to match a dimensionality of the input OGM.

In accordance with any of the preceding aspects, the system further comprises: a difference unit for calculating a difference between the input OGM and a previous input OGM representing occupancy of the sensed environment in a previous time step in the defined time period; and a third encoder for extracting motion-flow features from the difference. The recurrent neural network is configured to predict, at each time step in a defined time period, the corrective term based on the OGM features and the motion-flow features.

In accordance with any of the preceding aspects, the system further comprises a selector for selecting between the observed OGM and the previously-predicted OGM to use as the input OGM for the current time step, wherein the selector is configured to select the observed OGM during an initialization phase, and to select the previously-predicted OGM during a prediction phase.

In accordance with any of the preceding aspects, the system further comprises an output buffer for storing a set of OGMs including at least one of the input OGMs and the predicted OGMs, wherein output provided by the system is the set of OGMs.

In accordance with any of the preceding aspects, the system further comprises a sensor system configured to: receive sensor data about the sensed environment from one or more sensors; and generate the observed OGM based on the sensor data.

In accordance with another broad aspect, the present disclosure describes a method for generating predicted occupancy grid maps (OGMs) for an environment in which an autonomous vehicle is operating, the method comprising: receiving, at each time step in a defined time period, an input OGM for a current time step in the defined time period, the input OGM being one of an observed OGM for the current time step and a previously-predicted OGM for the current time step extracting, at each time step in the defined time period, OGM features from the input OGM; predicting, at each time step in the defined time period using a recurrent neural network, a corrective term based on the OGM features, wherein the corrective term represents a predicted change to the input OGM; applying, at each time step in the defined time period, the corrective term to the input OGM to generate a corrected OGM for a next time step in the defined time period, the corrected OGM representing features corresponding to occupancy of the environment for the next time step; converting, at each time step in the defined time period using a classifier, the correct OGM for the next time step to a predicted OGM for the next time step, the predicted OGM representing occupancy of the environment for the next time step; and outputting the predicted OGM.

In accordance with the preceding aspect, extracting the OGM features comprises: reducing, at each time step in the defined time period using a first encoder, the extracted OGM features to reduce a dimensionality of the extracted OGM features so that the extracted OGM features have a different dimensionality than the input OGM; and predicting, at each time step in the defined time period using a recurrent neural network, the corrective term comprises increasing, using a decoder, a dimensionality of the corrective term output from the recurrent neural network to match a dimensionality of the input OGM.

In accordance with any of the preceding aspects, the method further comprises receiving reference map features, representing a priori information about the sensed environment, and predicting comprises predicting, at each time step in the defined time period using the recurrent neural network, the correct term based on the OGM features and the reference map features.

In accordance with the preceding aspect, receiving the reference map features comprises: receiving a reference map representing the sensed environment; and extracting, using a second encoder, the reference map features from the reference map.

In accordance with any of the preceding aspects, the method further comprises determining motion-flow between the input OGM and a previous OGM representing occupancy in a previous time step, extracting, using a third encoder, to the motion-flow to extract motion-flow features from the motion-flow, and the predicting comprises predicting, at each time step in a defined time period, the corrective term using the recurrent neural network, based on the OGM features and the motion-flow features.

In accordance with any of the preceding aspects, the method further comprises calculating a difference between the input OGM and a previous input OGM representing occupancy in a previous time step in the defined time period, extracting, using a third encoder, motion-flow features from the difference, and the predicting comprises predicting, at each time step in the defined time period using the recurrent neural network, the corrective term based on the OGM features and the motion-flow features.

In accordance with any of the preceding aspects, the method further comprises in an initialization phase, selecting the observed OGM as the input OGM; and in a prediction phase, selecting the previously-predicted OGM as the input OGM.

In accordance with any of the preceding aspects, the method further comprises outputting at least the predicted OGM comprises outputting a set of OGMs including at least one observed OGM and at least one predicted OGM.

In accordance with another broad aspect, the present disclosure describes a non-transitory computer-readable medium comprising computer readable instructions which, when executed by at least one processor of a computer, cause the computer to: receive, at each time step in a defined time period, an input OGM for a current time step in the defined time period, the input OGM being one of an observed OGM for the current time step and a previously-predicted OGM for the current time step; extract, at each time step in the defined time period, OGM features from the input OGM; predict, at each time step in the defined time period using a recurrent neural network, a corrective term based on the OGM features, wherein the corrective term represents a predicted change to the input OGM; apply, at each time step in the defined time period, the corrective term to the input OGM to generate a corrected OGM for a next time step in the defined time period, the corrected OGM representing features corresponding to occupancy of the environment for the next time step; convert, at each time step in the defined time period using a classifier, the correct OGM for the next time step to a predicted OGM for the next time step, the predicted OGM representing occupancy of the environment for the next time step; and output the predicted OGM.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Some examples of the present disclosure are described in the context of autonomous vehicles. However, the methods and systems disclosed herein may also be suitable for implementation outside of autonomous vehicles, for example in non-vehicular autonomous, semi-autonomous devices, and non-autonomous devices (e.g., user-controlled devices). For example, any system or device that senses objects in a surrounding environment may benefit from the examples described here. Although the present disclosure describes uses for path planning, examples disclosed herein may have applications outside of path planning, and may be useful for mobile or non-mobile devices. Further, examples of the present disclosure may be implemented in image processing devices, such as workstations or other computing devices not related to autonomous machines (e.g., image processing systems).

Although examples described herein refer to a car as the autonomous vehicle, the teachings of the present disclosure may be implemented in other forms of autonomous or semi-autonomous vehicles including, for example, trams, subways, trucks, buses, watercraft, aircraft, ships, drones (also called unmanned aerial vehicles (UAVs)), warehouse equipment, construction equipment or farm equipment, and may include vehicles that do not carry passengers as well as vehicles that do carry passengers. The methods and systems disclosed herein may also be suitable for implementation in non-vehicular devices, for example autonomous vacuum cleaners and lawn mowers.

The present disclosure refers, in some examples, to learning-based systems that include neural networks. It should be understood that any learning-based system may be used in place of the neural network.

Figure 1A:
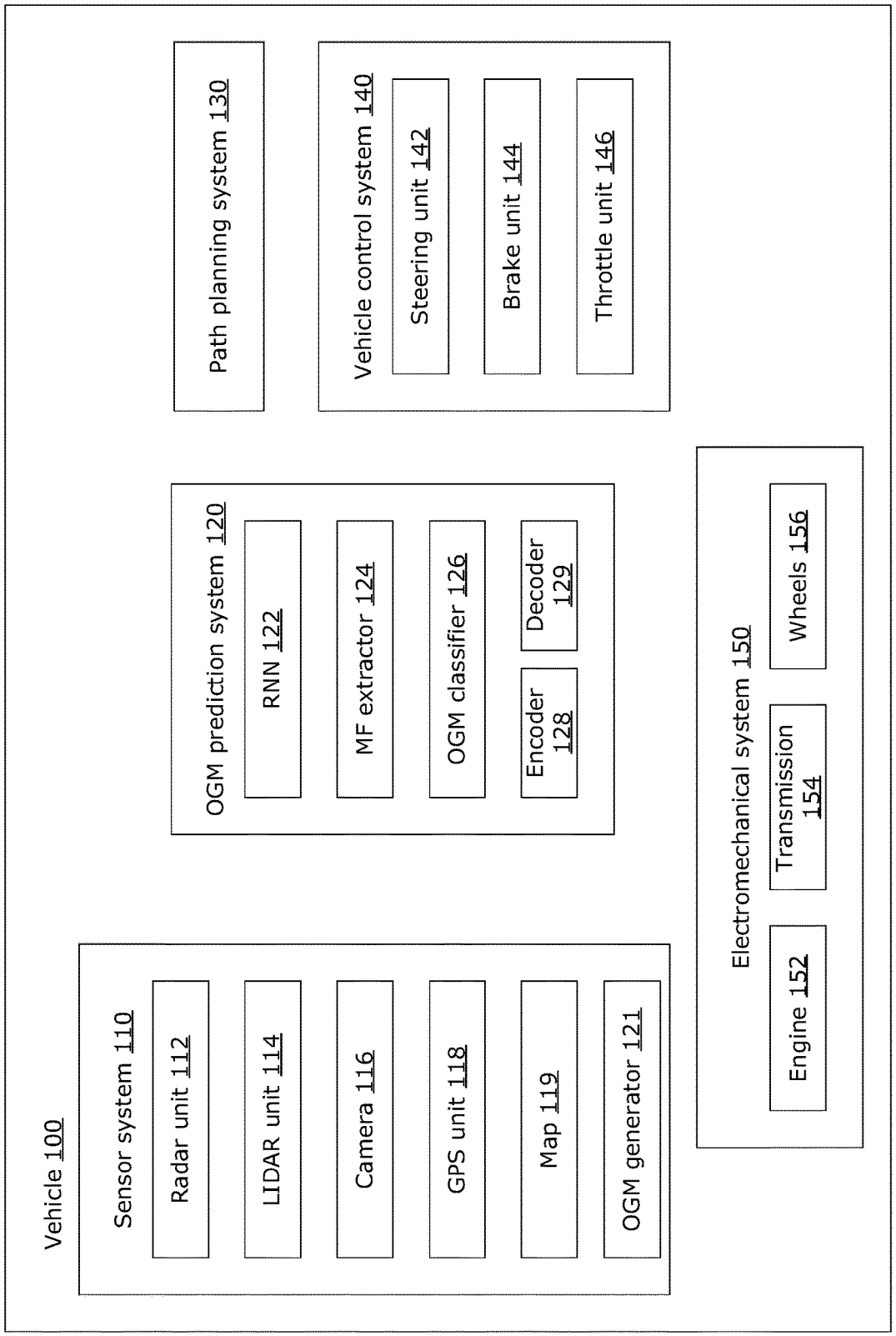
FIG. 1A is a block diagram illustrating some components of an example autonomous vehicle.

FIG. 1A is a block diagram illustrating certain components of an example autonomous vehicle 100 (hereinafter vehicle 100). Although described as being autonomous, the vehicle 100 may be operable in a fully-autonomous, semi-autonomous or fully user-controlled mode. In the present disclosure, the vehicle 100 is described in the embodiment of a car, however the present disclosure may be implemented in other vehicular or non-vehicular machines, as discussed above. The vehicle 100 may benefit from examples disclosed herein.

The vehicle 100 includes a sensor system 110, an OGM prediction system 120, a path planning system 130, a vehicle control system 140 and an electromechanical system 150, for example. The OGM prediction system 120 may be a machine-learning based system and may be implemented in different ways (e.g., embodiments 120a, 120b, 120c discussed below). Other systems and components may be included in the vehicle 100 as appropriate. Various systems and components of the vehicle may communicate with each other, for example through wired or wireless communication. For example, the sensor system 110 may communicate with the OGM prediction system 120, path planning system 130 and the vehicle control system 140; the OGM prediction system 120 may communicate with the path planning system 130 and the vehicle control system 140; the path planning system 130 may communicate with the vehicle control system 140; and the vehicle control system 140 may communicate with the electromechanical system 150.

The sensor system 110 receives information collected about the internal and/or external environment of the vehicle 100 by various sensing units. In the example shown, the sensor system 110 includes a radar unit 112, a LIDAR unit 114, a camera 116 and a global positioning system (GPS) unit 118 for collecting information about the external environment of the vehicle 100. The sensor system 110 may include other sensing units, such as a temperature sensor, precipitation sensor or microphone, among other possibilities.

The camera 116 may capture static images and/or a video comprising a set of images, for example, and may generate image data representative of the captured static image and/or the images of the video. The image data may be two-dimensional (2D) image data. Each pixel in the 2D image may encode red, green, blue (RGB) intensity values. The LIDAR unit 114 may include one or more LIDAR sensors configured to capture information in a wide view (e.g., 360° view) about the vehicle 100. The LIDAR sensor(s) of the LIDAR unit 114 may capture three-dimensional (3D) information about the external environment, which may be encoded in the form of a set of data points in 3D space (e.g., a 3D point cloud), where each data point in the set of data points in 3D space represents the 3D coordinates (e.g., x, y and z values in meters) of a sensed object in the 3D space (e.g., the point of origin from which light emitted by the LIDAR sensor is reflected from the object). The data points in a 3D point cloud may be irregularly spaced, depending on the external environment. In some examples, in addition to 3D coordinates, each data point in the set of data points may also contain other information, such as intensity of reflected light or time of detection.

The various sensing units 112, 114, 116, 118 may collect information about the local external environment of the vehicle 100 (e.g., any immediately surrounding obstacles) as well as information from a wider vicinity (e.g., the radar unit 112 and LIDAR unit 114 may collect information from an area of up to 100 m radius or more around the vehicle 100) and provide sensor data indicative of the collected information to an OGM generator 121. The GPS unit 118 of the sensor system 110 may also collect information about the position and orientation of the vehicle 100 relative to a frame of reference and provide sensor data indicative of the collected information about the position and orientation of the vehicle 100 relative to a frame of reference to the OGM generator. The sensor system 110 may also include other sensors (not shown) that collect further information about the vehicle 100 itself and provide sensor data indicative of the collected information about the vehicle 100 itself to the OGM generator 121. In such a case, the vehicle 100 may itself be considered part of the sensed environment. For example, the sensor system 110 may receive sensor data indicative of collected information about the vehicle 100 itself from other sensing units (not shown), such as accelerometers, speedometer, odometer and/or inertial measurement unit, which may or may not be part of the sensor system 110. The sensor system 110 may include a processor (not shown) that processes the sensor data indicative of collected information about the external environment of the vehicle 100 and the vehicle 100 itself to determine the state of the vehicle 100, such as linear speed, angular speed, acceleration and tire grip of the vehicle 100. The sensor system 110 may repeatedly (e.g., in regular intervals) receive sensor data from its sensing units 112, 114, 116, 118 and other sensing units in real-time. The sensor system 110 may in turn provide sensor data in real-time or near real-time to other components of the vehicle 100. The sensor system 110 also include a map 119, which may be a reference map that represents known information about the surrounding environment. For example, the map 119 may be received from an external reference database (e.g., retrieved based on the vehicle's position, as determined using the GPS unit 118).

The sensor system 110 communicates with the OGM prediction system 120 to provide observed OGMs. The sensor system 110 receives sensor data (e.g., observations) from the various sensing units, generates an observed OGM from the received sensor data (e.g., observations), and provides the observed OGM to the OGM system 120. In the present disclosure the OGM prediction system 120 is configured to make predictions for one or number OGMs, representing the surrounding environment, from one (or a series of) observed OGM(s) received from the sensor system 110 as described in further detail below. In this example, the OGM prediction system 120 includes a recurrent neural network (RNN) 122, a motion-flow (MF) extractor 124, an occupancy grid map (OGM) classifier 126, an encoder 128 and a decoder 129. In some examples, the encoder 128 and the decoder 129 may be implemented together as an encoder/decoder. The RNN 122, MF extractor 124, OGM classifier 126, encoder 128 and decoder 129 operate together to generate predicted OGMs from observed OGMs, as discussed further below.

Although the OGM generator 121 is shown as part of the sensor system 110, in alternative embodiments the OGM generator 121 may be part of the OGM prediction system 120. In this alternative embodiment, the sensor system 110 provides sensor data (observations) received from the sensing units 112, 114, 116, 118, as well as data from a reference map, including image data and 3D data, to the OGM prediction system 120. The OGM generator 121 included in the OGM prediction system 120 generates observed OGMs from the received sensor data, and provides the observed OGMs to selectors 302a, 302b as described in further detail below.

The OGM prediction system 120 may be implemented using software, which may include any number of independent or interconnected software modules. For example, in FIG. 1A, RNN 122, MF extractor 124, OGM classifier 126, encoder 128 and decoder 129 are separate independent software modules. Although illustrated as separate software modules in FIG. 1A, RNN 122, MF extractor 124, OGM classifier 126, encoder 128 and decoder 129 may be combined into a single software module. Alternatively, the RNN 122, MF extractor 124, OGM classifier 126, encoder 128 and decoder 129 of the OGM prediction system 120 may be implemented in a dedicated hardware device, such as a field programmable gate array or application specific integrated circuit.

The software modules of the OGM prediction system 120 includes machine readable instructions which may be executed by one or more processing units of a vehicle controller (not shown) of the vehicle 100. The processing unit may be central processing unit (CPU), a graphic processing unit (GPU), a tensor processing unit (TPU), a neural processing unit (NPU), and the like. The OGM prediction system 120 may repeatedly (e.g., in regular intervals) receive observed OGMs from the OGM generator 121 of the sensor system 110 and generate predicted OGMs in real-time or near real-time. Alternatively, the OGM prediction system 120 may receive observed OGMs from storage 178.

Sensor data (e.g., observations) from the sensor system 110 and the predicted OGMs output from the OGM prediction system 120 may be provided to the path planning system 130. The path planning system 130 carries out path planning for the vehicle 100. For example, the path planning system 130 may plan a path for the vehicle 100 to travel from a starting point to a target destination, using information from the GPS unit 118. The path planning system 130 may be implemented as one or more software modules or control blocks that include machine readable instructions that are executable by one or more processing units in the vehicle 100. In some examples, the path planning system 130 may perform path planning at different levels of detail, for example on a mission planning level, on a behavior planning level, and on a motion planning level. The output from the path planning system 130 may include data defining one or more planned paths for the vehicle 100 to travel. The path planning carried out by the path planning system 130 is performed in real-time or near real-time, to enable the vehicle 100 to be responsive to real-time changes in the sensed environment. Output from the path planning system 130 may be provided to the vehicle control system 140.

The vehicle control system 140 serves to control operation of the vehicle 100. The vehicle control system 140 may be used to provide full, partial or assistive control of the vehicle 100. The vehicle control system 140 may serve to fully or partially control operation of the electromechanical system 150, when the vehicle 100 is operating autonomously or semi-autonomously, based on the planned path from the path planning system 130. Information from the sensor system 110 and/or the data analysis system 120 may also be used by the vehicle control system 140. In this example, the vehicle control system 140 includes a steering unit 142, a brake unit 144 and a throttle unit 146. Each of these units 142, 144, 146 may be implemented as separate or integrated software modules or control blocks within the vehicle control system 140. The units 142, 144, 146 generate control signals to control the steering, braking and throttle, respectively, of the vehicle 100. The vehicle control system 140 may include additional components to control other aspects of the vehicle 100 including, for example, control of turn signals and brake lights.

The electromechanical system 150 receives control signals from the vehicle control system 140 to operate the mechanical components of the vehicle 100. The electromechanical system 150 effects physical operation of the vehicle 100. In the example shown, the electromechanical system 150 includes an engine 152, a transmission 154 and wheels 156. The engine 152 may be a gasoline-powered engine, an electricity-powered engine, or a gasoline/electricity hybrid engine, for example. Other components may be included in the electromechanical system 150, including, for example, turn signals, brake lights, fans and windows.

The vehicle 100 may include other systems that are not shown, including, for example, a learning-based computer vision system that is trained to detect and identify objects in the external environment, for example to detect and identify a pedestrian or another car, using data received from the radar unit, the LIDAR unit 114, and/or the camera unit 116, a user interface system and a wireless communication system (e.g., including an antenna). These other systems may also provide input to and/or receive output from the above-described systems. The vehicle 100 may communicate with an external system, for example the vehicle 100 may communicate with an external map database to receive the map 119. The vehicle 100 may also communicate with a network, for example a vehicle network that enables communication among autonomous, semi-autonomous or non-autonomous vehicles.

The sensor system 110, the OGM prediction system 120, the path planning system 130 and the vehicle control system 140 may be individually or in combination be implemented, at least in part, in one or more processing units of the vehicle 100.

Figure 1B:
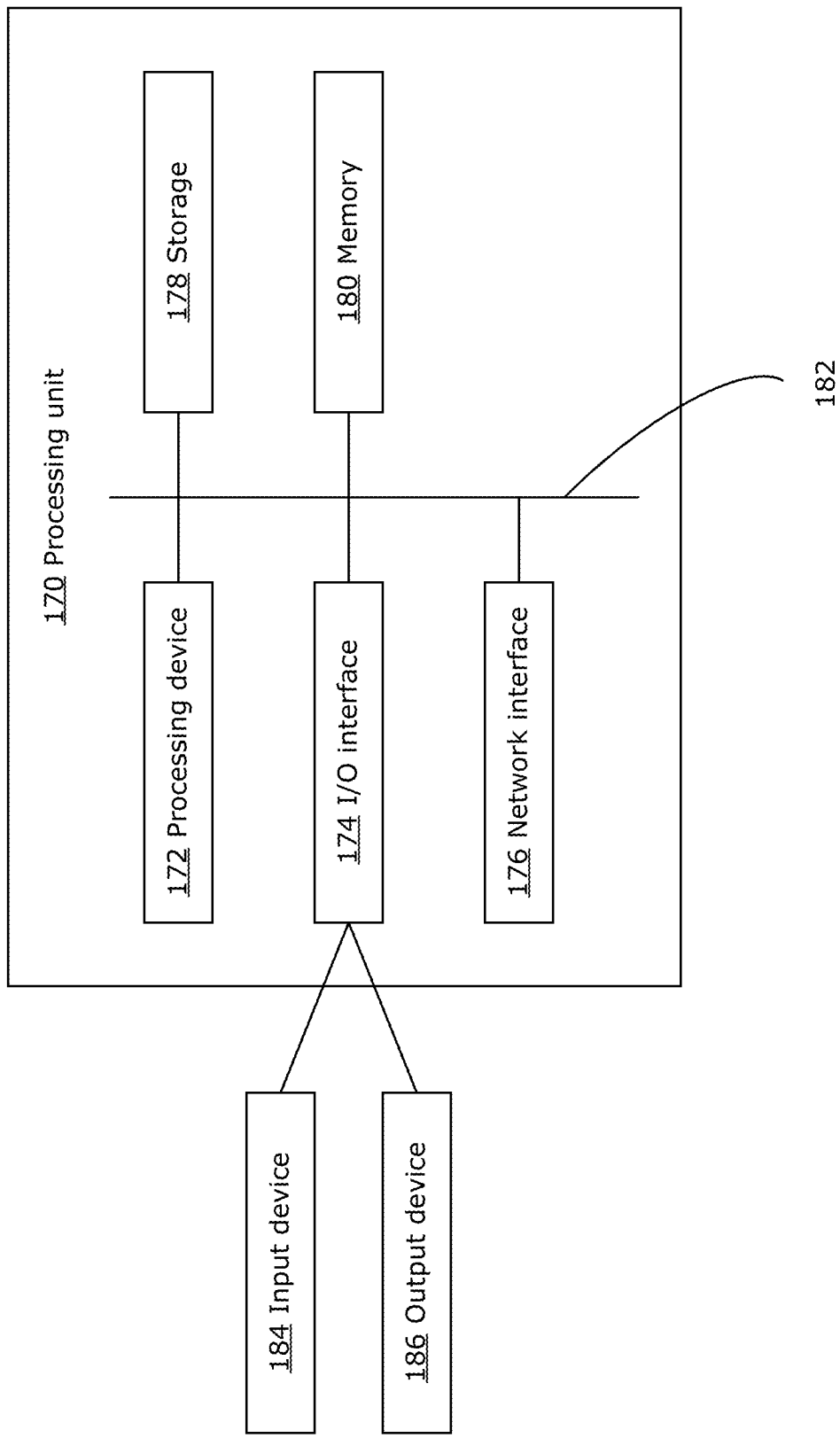
FIG. 1B is a block diagram illustrating an example processing system that may be used in the autonomous vehicle of FIG. 1A.

FIG. 1B is a block diagram of an example simplified processing unit 170, which may be used as a dedicated processing unit for performing OGM prediction or a general processing unit in the vehicle 100. The processing unit 170 may be used to execute the machine readable instructions of the OGM prediction system 120, in order to implement methods and examples described herein. The processing unit 170 may also be used to execute the machine readable instructions of one or more of the path planning system 130 and the vehicle control system 140. Other processing units suitable for implementing embodiments described in the present disclosure may be used, which may include components different from those discussed below. The processing unit 170 includes multiple components, including one or more processing devices 172 that control the overall operation of the processing unit 172. The one or more processing devices 172 are coupled to and interact with other components of the processing unit 170, including an input/output (I/O) device interface 174, a network interface 176, a storage unit 178, and a memory 180. Although FIG. 1B shows a single instance of each component, there may be multiple instances of each component in the processing unit 170.

The processing device(s) 172 of the processing unit 170 may be a processor, a microprocessor, an application-specific integrated circuit (ASIC), a field-programmable gate array (FPGA), a dedicated logic circuitry, or any combination thereof. The input/output (I/O) interface(s) 174, which may enable interfacing with one or more appropriate input device(s) 184 and/or output device(s) 186. The network interface(s) 176 is/are configured for wired or wireless communication with a network (e.g., an intranet, the Internet, a P2P network, a WAN and/or a LAN) or other node. The network interface(s) 176 may include wired links (e.g., Ethernet cable) and/or wireless links (e.g., one or more antennas) for intra-network and/or inter-network communications.

The storage unit(s) 178 may include a mass storage unit such as a solid state drive, a hard disk drive, a magnetic disk drive and/or an optical disk drive. The non-transitory memories(s) 180 may include a volatile or non-volatile memory (e.g., a flash memory, a random access memory (RAM), and/or a read-only memory (ROM)). The non-transitory memory(ies) 180 may store instructions for execution by the processing device(s) 172, such as to carry out examples described in the present disclosure. The memory(ies) 180 may store other software instructions, such as for implementing an operating system and other applications/functions. In some examples, one or more data sets and/or modules may be provided by an external memory (e.g., an external drive in wired or wireless communication with the processing unit 170) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The processing unit 170 may also include a bus 182 providing communication among components of the processing unit 170, including the processing device(s) 172, I/O interface(s) 174, network interface(s) 176, storage unit(s) 178 and/or memory(ies) 180. The bus 182 may be any suitable bus architecture including, for example, a serial bus architecture or a parallel bus architecture. The processing unit 170 may also include an external or peripheral bus 188 providing communication among I/O interface(s) and the input and output device(s) 186, 188.

In FIG. 1B, the input device(s) 184 (e.g., a keyboard, a mouse, a microphone, a touchscreen, and/or a keypad) and output device(s) 186 (e.g., a display, a speaker and/or a printer) are shown as external to the processing unit 170. In other examples, one or more of the input device(s) 184 and/or the output device(s) 186 may be included as a component of the processing unit 170. In other examples, there may not be any input device(s) 184 and output device(s) 186, in which case the I/O interface(s) 174 may not be needed.

Figure 2:
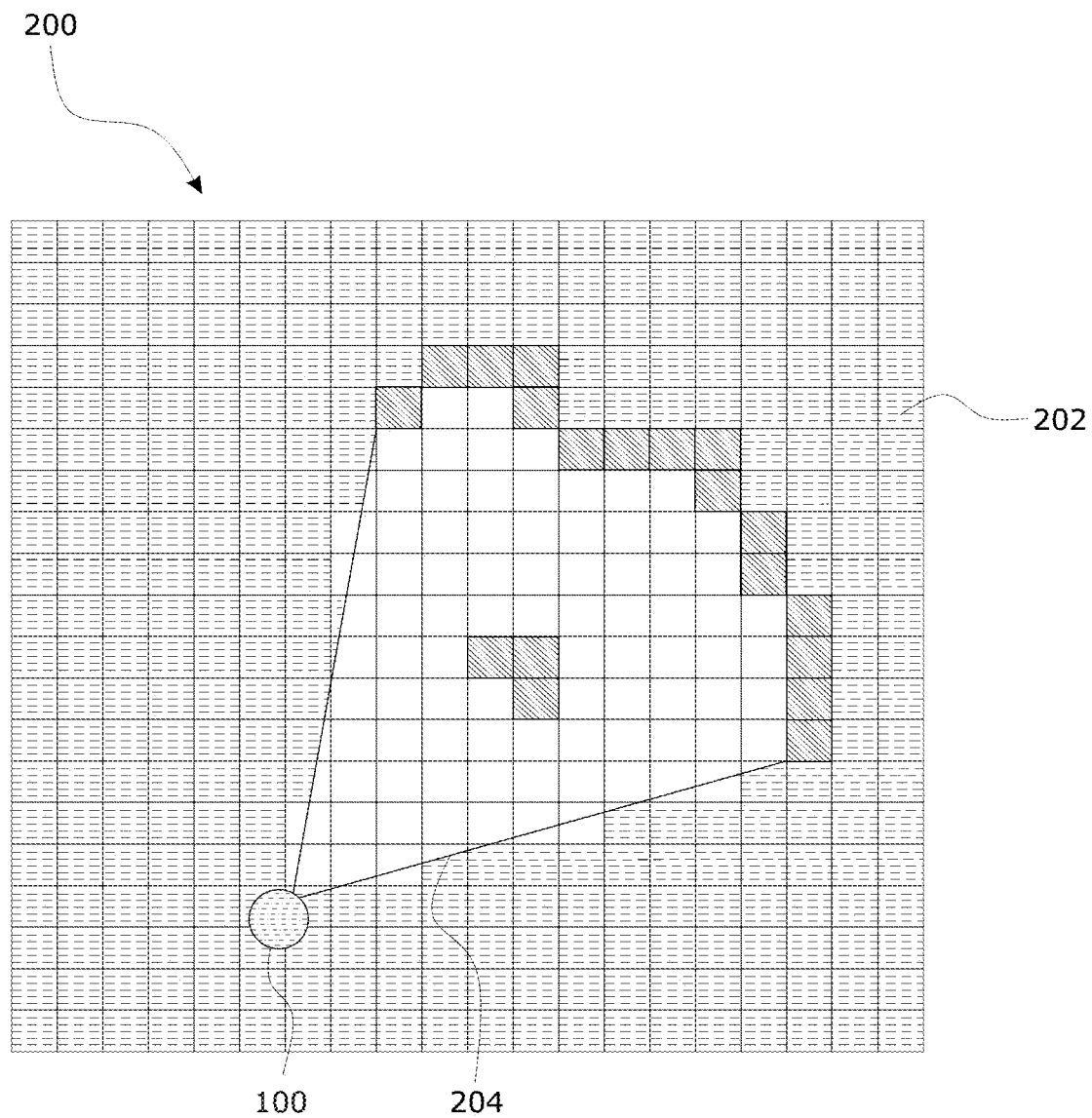
FIG. 2 is an example of a simple OGM.

As mentioned above, OGMs may be used to represent the external environment surrounding an autonomous device. An OGM may be generated by the OGM generator 121 using sensor data (e.g. observations) received from one or more of the sensing units 112, 114, 116, 118. In some example embodiments, an OGM may be generated by the OGM generator 121 using sensor data received from the LiDAR unit 114. FIG. 2 shows an example of a simple OGM 200. In this example, the OGM 200 is represented by a 2D grid, in which the sensed environment is divided into cells 202. The OGM 200 is simplified for ease of understanding. It should be understood that an OGM may, in general, be of any dimension, with any desired resolution and have any number of cells. Although shown as a 2D grid in FIG. 2, an OGM may also be represented as a 3D grid, divided into 3D cells or voxels. The vehicle 100 is represented at a certain position in the OGM 200 and senses the environment within a certain FOV 204 (which may be dependent on the configuration of the sensors of the vehicle 100). In FIG. 2, a representation of the vehicle 100 and the FOV 204 is included to help in understanding, however the OGM 200 typically may not include representation of the vehicle 100 and the FOV 204. Each cell 202 of the OGM 200 contains a value indicating the probability (typically represented as a value between 0 and 1) that the cell 202 is occupied. In this simplified example, a cell 202 that is likely to be occupied (e.g., having probability of 0.5 or greater) is shown in black, and a cell 202 that is likely to be unoccupied (e.g., having probability of less than 0.5) is shown in white. Cells 202 with unknown probability (e.g., representing areas outside the FOV 204, or areas that are blocked or hidden from the sensors of the vehicle 100) are shown in gray. The probability threshold for identifying a cell 202 as occupied or unoccupied may be varied, for example depending on the path planning algorithm and/or depending on safety requirements. An occupied cell 202 may be considered an obstacle to be avoided, during path planning. As will be appreciated, in the case of a moving vehicle 100, the ego motion of the vehicle 100 also affects the information sensed from the environment, and this ego motion should be taken into account. Further, in real-world applications, the environment may be dynamically changing and may be unstructured (that is, containing objects with undefined motion trajectories). For an environment that is dynamically changing and unstructured, the ability to predict future OGMs is useful.

To help appreciate the present disclosure, some approaches to OGM prediction are now discussed. Dequaire, et al. (Deep tracking in the wild: End-to-end tracking using recurrent neral networks, *The International Journal of Robotics Research*, 2017, Vol 37, pp. 495-512), describe an approach that uses a two stage process. In the first stage, a convolutional recurrent neural network (ConvRNN) receives observed OGMs to initialize its state. In the second stage, which is the prediction phase, the same network receives blank OGMs and uses its state to predict the future OGMs. However, this approach is likely computationally too expensive to be used in real-time when applied to high resolution OGMs, such as for application in an autonomous vehicle. As well, this approach may not sufficiently compensate for the ego motion of the vehicle for multi-step prediction. Also, this approach may have difficulties in extending the prediction of OGMs more than a few frames. Another approach is discussed by Nico, et al. (Deep Object Tracking on Dynamic Occupancy Grid Maps Using RNNs, s.1, arXiv preprint arXiv:1805.08986, 2018), which employs Dynamic OGMs (DOGMa), which are OGMs augmented with Dempster-Shafer masses for free and occupied cells. An automatic label generation method is used to generate bounding boxes as labels for training their RNN. However, this approach uses a neural network architecture which is computationally too expensive to run for a multi-step prediction. Further, this approach is described only for sensing the environment from a stationary platform, such as a stationary vehicle, and does not compensate for the ego motion of the vehicle.

The present disclosure describes a machine learning-based system for OGM prediction (e.g., the OGM prediction system 120) that aims to address one or more of the drawbacks discussed above. The disclosed OGM prediction system 120 generates, at each time step in a defined time period, a predicted OGM (e.g., one predicted OGM) for the next time step in the defined time period based on an input OGM for a current time step in the defined time period. The input OGM for the current time step may be a historical observed OGM obtained from a set of historical observed OGMs (e.g., a set comprising about 10 observed OGMs generated by the OGM generator 121 from sensor data received from one or more of the sensing units 112, 114, 116, 118) or a previously-predicted OGM (e.g., a predicted OGM previously generated by the OGM prediction system 120 for the current time step in the defined time period). This approach may be acceptable in situations where large, abrupt changes in the environment are not expected (e.g., a vehicle traveling at a typical speed of 60 km/h is not expected to come to a complete stop within one second).

The disclosed OGM prediction system 120 includes encoder/decoder(s) so that large observed OGMs may be processed in a relatively short period of time (e.g., equal to or faster than the frequency for obtaining one frame of sensor data using typical sensors on an autonomous vehicle). In the example discussed below, the disclosed OGM prediction system 120 includes a RNN. The RNN may be any suitable RNN, such as a RNN that has a series of gated recurrent units (GRUs) and/or long-short-term memory (LSTM) layers. In some examples, instead of the RNN, the OGM prediction system 120 may include a machine learning module that implements a learned model that generates predicted OGMs from an input OGM. The disclosed OGM prediction system 120 receives as input an OGM, and generates a predicted OGM based on the input OGM for each time step in a pre-defined time period. In some examples, the disclosed OGM prediction system 120 may also use information about the motion-flow of the OGM and information about the environment, to generate a predicted OGM. In the disclosed OGM prediction system 120, a corrective term (also referred to as a compensation term or compensation matrix) is predicted at each time step. A predicted OGM is then the generated by applying a classifier on the sum of the corrective term and the input OGM. Patterns may be determined based on the corrective term, and such patterns may be useful for other tracking algorithms. The disclosed OGM prediction system 120 may not require a labeled training dataset for learning the model, and may work with observed OGMs generated directly from sensor data as described above. In various examples, the disclosed OGM prediction system 120 has been found to accurately distinguish between static and dynamic objects in the environment.

To assist in understanding the present disclosure, some notations are first discussed. The present disclosure discusses OGMs that are either observed or predicted over time, thus is concerned with a time-series. A time-series is a mathematical sequence. A sequence consists of two or more values where the order of values matters. Sampling a continuous signal at a given frequency results in a discrete time signal that is a time-series. In this disclosure, the index k is used to indicate the discrete time step, that is, the order in the time-series. Note that k does not indicate the absolute or relative time. For instance, consider a signal that is sampled at 10 Hz, then the samples (also referred to as time steps) are partitioned into segments of 20 time steps each. Each segment thus corresponds to 2 seconds of the original signal, and for each segment k=0, 1, 2, . . . , 19.

As discussed above, the disclosed OGM prediction system 120 generates, at each time step in a defined time period, a predicted OGM for a next time step in a defined time period based on an input OGM for a current time step in the defined time period. The input OGM is a historical observed OGM for the current time step in an initialization phase of the defined time period and a predicted OGM for current time step in a prediction phase of the defined time period. Thus, a run of the disclosed OGM prediction system 120 may be considered to have two phases: the initialization phase and the prediction phase. The initialization phase includes $\tau_o$ time steps and the prediction phase includes $\tau_p$ time steps. For example, in a defined time period having 20 time steps at a frequency of 10 Hz, the initialization phase may be 1 second in length (e.g. the initialization phase may have a time duration of 1 second) with $\tau_o$=10 (e.g., 10 time steps) and the prediction phase may be 1 second in length (e.g. the observation phase may have a time duration of 1 second) with $\tau_p$=10 (e.g., 10 time steps). It should be understood that this is an example only. The initialization phase may have a different length of time (e.g., time duration) than the prediction phase, and the initialization phase may have a different number of time steps than the prediction phase. In some examples, the time steps during the initialization phase may have a different frequency than time steps during the prediction phase.

In general, a single run of the disclosed OGM prediction system 120 generates, at each time step in the initialization phase of the defined time period, a predicted OGM for the next time step in the defined time period based on a historical observed OGM for the current time step in the defined time period, and generates, at each time step in the prediction phase of the defined time period, a previously-predicted OGM (e.g., a predicted OGM previously generated for the current time step in the defined time period). The historical observed OGM may be obtained from a set of observed OGMs from a defined previous time period (having one or more time steps, and including a current time step). Each run of the disclosed OGM prediction system 120 includes historical observed OGMs and predicted OGMs. If the OGM prediction system 120 is used to provide predicted OGMs in real-time (e.g., for real-world implementation in an autonomous vehicle, such as vehicle 100), a single run of the OGM prediction system 120 may be completed at or faster than the frequency at which observed OGMs are generated. The output from a single run of the disclosed OGM prediction system 120 is a plurality of OGMs, including the one or more historical observed OGMs and predicted OGMs over a defined time period that includes past and future defined time periods. In the example where the disclosed OGM prediction system 120 generates predictions in real-time, the output is a set of OGMs that includes one or more historical observed OGMs (for a defined number of previous time steps up to the current time step) and also includes one or more predicted OGMs (for a defined number of future time steps, starting from the time step immediately after the current time step). The outputted set of OGMs may be used by a path planning system of an autonomous vehicle, such as path planning system 130 of vehicle 100. Because the outputted set of OGMs includes both past OGMs (e.g., historical observed OGMs) and future OGMs (e.g. predicted OGMs), the path planning that is performed based on this set of OGMs may thus be better able to take into account the dynamic and unstructured nature of the surrounding environment. In other examples, the disclosed OGM prediction system 120 may be used outside of an autonomous vehicle.

During the initialization phase, the OGM prediction system 120 generates, at each time step, a predicted OGM for the next time step based on a historical observed OGM for the current time step. The historical observed OGM may be received from, for example, the sensor system 110, a buffer storing a set of historical observed OGMs, or a database storing the set of historical observed OGMs. A historical observed OGM may be obtained using a variety of methods. For example, an observed OGM may be generated by an OGM generator 121 of the sensor system 110 using sensor data received from one or more of the sensing units 112, 114, 116, 118. Any suitable method of obtaining an OGM may be used. It may be noted that the predicted OGMs generated by the disclosed OGM prediction system 120 may be qualitatively dependent on the observed OGMs (e.g., in terms of resolution and frequency). The disclosed OGM prediction system 120 generates predicted OGMs that are of the same size as the historical observed OGMs. Further, the predicted OGMs may correspond to the same frequency at which the observed OGMs are obtained (although, as discussed above, the predicted OGMs may be generated faster than this frequency). For example, if the observed OGMs are at 10 Hz (that is, a new observed OGM is obtained every 100 ms), then each predicted OGM generated based on the new observed OGM by the disclosed OGM prediction system 120 corresponds to time steps at 100 milliseconds intervals.

To formally and mathematically distinguish between the initialization phase and the prediction phase, a state flag (also referred to as "eyes-state") may be used. The state flag at each time step is either a 0 (indicating the prediction phase, or an "eyes-closed" state) or a 1 (indicating the observation phase, or an "eyes-opened" state). The state flag is a function of the time step k and in this disclosure is denoted by $\delta_k$ where:

$$\delta_k = \begin{cases} 1, \text{ initialization phase} \\ 0, \text{ prediction phase} \end{cases} \quad (1)$$

For the example of 20 time steps with $\tau_o$=10 and $\tau_p$=10, the state flag is defined as:

$$\delta_k = \begin{cases} 1, & k < 10 \\ 0, & k \geq 10 \end{cases}$$

Each run of the disclosed OGM prediction system 120 iterates through all k time steps. In the example of 20 time steps evenly split between the initialization phase and the prediction phase, a single run of the disclosed OGM prediction system 120 generates, at each of the first 10 time steps, a predicted OGM for the next time step based on a historical observed OGM for the current time step obtained from the set of observed OGMs, and generates, at the each of the next 10 time steps, a predicted OGM for the next time step based on a previously-predicted OGM for the current time step.

Using the notation introduced above, an example embodiment of the disclosed OGM prediction system 120a will now be discussed in detail with respect to FIG. 3. The notations that are used to describe the example embodiment OGM prediction system 120a of FIG. 3 will be used throughout the present disclosure.

An input to the OGM prediction system 120a is the observed OGM $o_k^*$, which may be generated in real-time based on sensor data (e.g., observations) by the OGM generator 121 of the sensor system 110 and/or which may be retrieved from an internal or external database. The observed OGM $o_k^*$ may be represented as a tensor, having a depth of one or more. The depth represents the number of channels. In the case of the observed OGM $o_k^*$, a tensor of depth one may be used to carry information representing the occupancy of each cell. Additional channels may be used to carry further information for each cell, such as the class label assigned for each cell or the velocity of the object in each cell.

Another input to the OGM prediction system 120a is a reference map $M_k^*$, representing known features or a priori knowledge about the surrounding environment. The reference map $M_k^*$ may be retrieved from a reference database (e.g., an external map database). Although the reference map $M_k^*$ is shown as being indexed to the time step k, the reference map $M_k^*$ may be expected to include relatively static information about the environment (e.g., location of known roads in the environment), and the same reference map may be used for all time steps in a single run of the OGM prediction system 120a without having to retrieve or update the reference map for each time step. The reference map $M_k^*$ may be represented as a tensor, having a channel depth of one or more. For example, where the reference map $M_k^*$ is mainly used to indicate on-road and off-road areas, a tensor depth of one channel may be sufficient. Additional channels may be used to provide further information about the environment, for example to indicate sidewalk areas or cyclist lanes, among other possibilities. Where appropriate, the reference map $M_k^*$ may be preprocessed (e.g., scaled, resized and/or cropped) to match the size and resolution of the observed OGM $o_k^*$.

In this example OGM prediction system 120a, OGM predictions are generated based on features $f_k^m$ extracted from the reference map $M_k^*$, features $f_k^o$ extracted from the OGM (observed or predicted) at each time step, and features $f_k^p$ extracted from a motion-flow $\mu_k$ of the OGM at each time step. Generally, features may be extracted using any suitable neural network, for example a convolution neural network, as discussed further below. The features $f_k^o$ extracted from the input OGM may be represented in the form of feature vectors associated with each cell of the OGM, thus the features $f_k^o$ may be represented as a matrix or tensor having a depth equal to the number of extracted features. Similarly, the features $f_k^m$ and features $f_k^p$ may also be represented as respective matrices or tensors having depths equal to the number of respective extracted features. The motion-flow $\mu_k$ of the OGM may be determined using the MF extractor 124, as discussed further below. The motion-flow $\mu_k$ may be represented as a tensor, which may have three channels depth (containing information about motion in each of the x, y and z directions) or more channels. The features $f_k^m$, $f_k^o$, $f_k^p$ are stacked together (e.g., concatenated) using the concatenation operation 306. In order to be stacked together, at least the x and y dimensions of the features $f_k^m$, $f_k^o$, $f_k^p$ should be equal. The stacked features $f_k^m$, $f_k^o$, $f_k^p$ should are provided together as input to the RNN 122, which predicts the corrective term. Notably, the RNN 122 predicts the corrective for the next time step.

At each time step, the input OGM $o_k$ is either the observed OGM $o_k^*$ at that time step, or the previously predicted OGM. That is:

$$o_k = \delta_k o_k^* + (1-\delta_k)\tilde{o}_k. \quad (2)$$

where $\tilde{o}_k$ is the predicted OGM (which may be represented as a tensor with channel depth of one or more, similar to the observed OGM $o_k^*$). The selectors 302a, 302b may be used to select between the observed OGM $o_k$ and the predicted OGM $\tilde{o}_k$, so as to implement equation (2), based on the definition of the state flag $\delta_k$. Generally, the selectors 302a, 302b may be replaced by any component that can implement equation (2). For example, the selectors 302a, 302b may be replaced by a simple switch.

The predictions generated by the RNN 122 are represented by a corrective term $\Delta o_k$. The corrective term $\Delta o_k$ may also be referred to as a compensation matrix or a compensation term. The corrective term $\Delta o_k$ is summed with the input OGM $o_k$ to obtain the corrected OGM $\hat{o}_k$ (which may be represented as a tensor with channel depth of one or more, similar to the observed OGM $o_k^*$), using the equation:

$$\hat{o}_{k+1} = o_k + \Delta o_k. \quad (3)$$

The corrected OGM $\hat{o}_{k+1}$ is inputted to the OGM classifier 126, to output the predicted OGM $\tilde{o}_{k+1}$ (which may be represented as a tensor with channel depth of one or more, similar to the observed OGM $o_k^*$). It should be noted that, at each time step k, the OGM prediction system 120a outputs the predicted OGM corresponding to the next time-step, that is $\tilde{o}_{k+1}$. This is because the predicted OGM is the result of deciphering the corrected OGM, $\hat{o}_{k+1}$, by the OGM classifier 126. A single run of the OGM prediction system 120a generates predicted OGMs over all time steps. The predicted OGM generated at each time step may be stored in an output buffer 308 and provided as output when a single run has been completed. The OGM prediction system 120a is recurrent, meaning that it is equipped with feedback connections. The propagation of input signals toward output, which yields the prediction at each time step is considered one iteration. Detailed description of one iteration is provided below.

Firstly, the input OGM $o_k$ is determined using equations (1) and (2) above. That is, the input OGM $o_k$ is either the observed OGM $o_k^*$ or the predicted OGM $\tilde{o}_k$ from the previous time step (delayed one time step using a delay block 304b, for example).

The motion-flow $\mu_k$ of the input OGM $o_k$ is determined using the MF extractor 124. The MF extractor 124 determines motion-flow by applying a motion-flow algorithm on the input OGM $o_k$ and also the immediately previous input OGM $o_{k-1}$ (obtained using the delay block 304a). Generally, the MF extractor 124 may use any suitable motion-flow or optical-flow algorithm to determine the motion-flow between two consecutive OGMs. In some examples, motion-flow may also be referred to as optical-flow, where optical-flow refers to the pattern of motion of objects in a visual scene. In the simple case where the OGM is represented as a 2D grid, the MF extractor 124 may generate two output matrices of the same dimension as the x and y dimension of the input OGMs $o_k$ and $o_{k-1}$. Each of the output matrices represent the movement of cells between the two OGMs in x and y dimensions.

Figure 4:
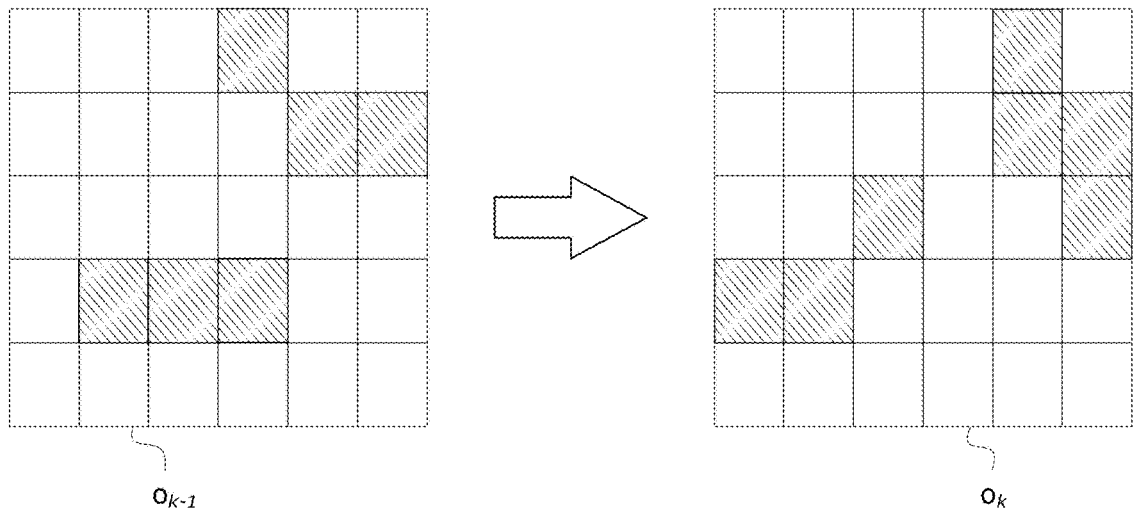
FIG. 4 illustrates an example of motion-flow in an OGM, and an example of how motion-flow may be represented as matrices.
Figure 4:
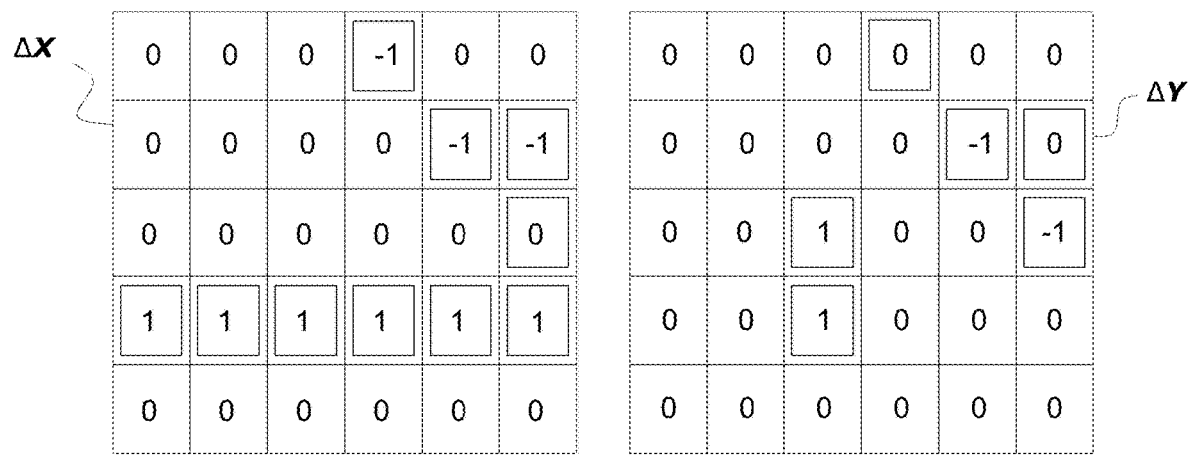

FIG. 4 illustrates a simple example of how motion-flow is determined. FIG. 4 shows input OGM $o_{k-1}$ from the immediately previous time step k−1, and the input OGM $o_k$ at the current time step k, each with black cells indicating occupied cells and white cells indicating unoccupied cells. As can be seen, there is a change in the occupancy of the cells, indicating motion of objects. The MF extractor 124 calculates the motion between the two OGMs and outputs matrix ΔX representing motion in the x direction (in this case, horizontal motion) and matrix ΔY representing motion in the y direction (in this case, vertical motion).

The values shown in the matrices ΔX and ΔY indicate the amount of movement of the corresponding cell between the two OGMs, measured in number of cells. Assume that the value at location (x,y) of the OGM at time step k, is represented by $o_k(x,y)$. In order to understand how $o_{k+1}$ is obtained using the motion flow represented by the matrices ΔX and ΔY, the first step is to generate a mesh-grid of (x,y) indices, namely $M_a$ and $M_b$, as follows, $$M_a = \begin{bmatrix} 1 & 2 & 3 & 4 & 5 & 6 \\ 1 & 2 & 3 & 4 & 5 & 6 \\ 1 & 2 & 3 & 4 & 5 & 6 \\ 1 & 2 & 3 & 4 & 5 & 6 \\ 1 & 2 & 3 & 4 & 5 & 6 \end{bmatrix}, M_b = \begin{bmatrix} 1 & 1 & 1 & 1 & 1 & 1 \\ 2 & 2 & 2 & 2 & 2 & 2 \\ 3 & 3 & 3 & 3 & 3 & 3 \\ 4 & 4 & 4 & 4 & 4 & 4 \\ 5 & 5 & 5 & 5 & 5 & 5 \end{bmatrix}$$

Note that $M_a$ and $M_b$ are simply the x and y indices, respectively, of the OGM cells. That is:

$$o_k(x,y) = o_k(M_a(x,y), M_b(x,y)).$$

Adding the motion-flow matrices ΔX and ΔY, in the example of FIG. 4, to the index matrices, $M_a$ and $M_b$, the index matrices for $o_{k+1}$ is obtained as follows:

$$N_a = \begin{bmatrix} 1 & 2 & 3 & 3 & 5 & 6 \\ 1 & 2 & 3 & 4 & 4 & 5 \\ 1 & 2 & 3 & 4 & 5 & 6 \\ 2 & 3 & 4 & 5 & 6 & 7 \\ 1 & 2 & 3 & 4 & 5 & 6 \end{bmatrix}, N_b = \begin{bmatrix} 1 & 1 & 1 & 1 & 1 & 1 \\ 2 & 2 & 2 & 2 & 1 & 2 \\ 3 & 3 & 4 & 3 & 3 & 2 \\ 4 & 4 & 5 & 4 & 4 & 4 \\ 5 & 5 & 5 & 5 & 5 & 5 \end{bmatrix}.$$

Then, $o_{k+1}(x,y) = o_k(N_a(x,y), N_b(x,y))$, as shown in FIG. 4.

The above example is a relatively simple case. In general, extracting motion-flow may be more complicated, and may be performed for motion in 3D (i.e., also including motion in the z direction). Any suitable motion-flow extraction method may be used for the MF extractor 124, such as the algorithm described by Farnebäck (Two-frame motion estimation based on polynomial expansion, *Scandinavian conference on Image analysis*, Berlin, Heidelberg: Springer, 2003). The MF extractor 124 may, for example, be classical extractor, or may implement any suitable machine learning-based algorithm.

Figure 5:
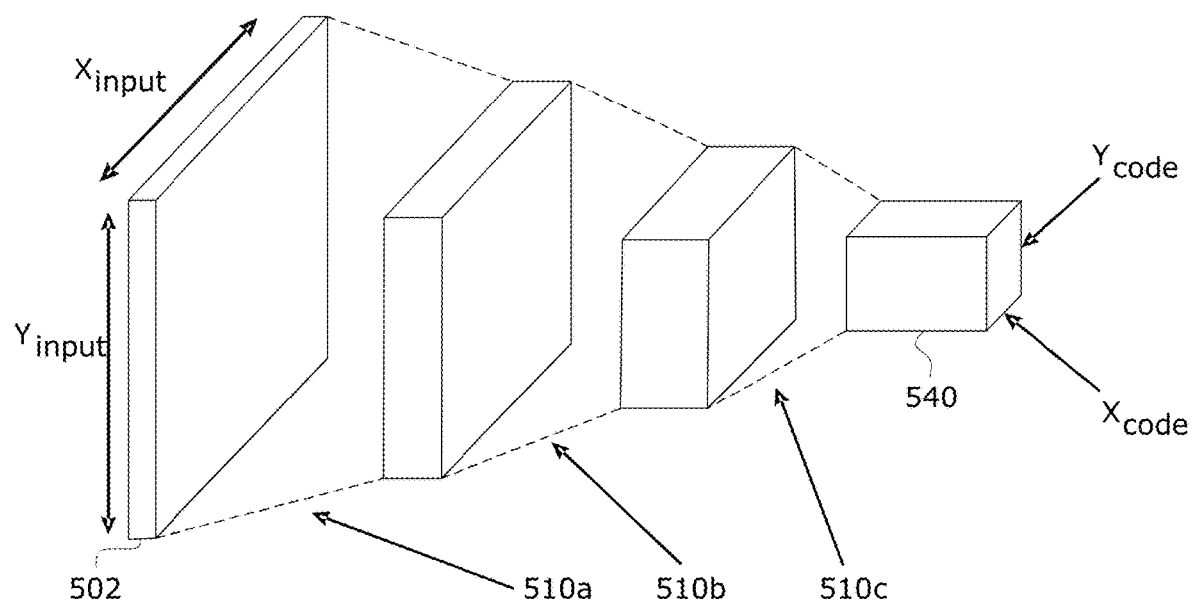
FIG. 5 is a conceptual representation of how an encoder may change the dimensionality of data.

Reference is again made to FIG. 3. Encoders 128a, 128b, 128c extract the features $f_k^m$, $f_k^o$, $f_k^p$ from the reference map $M_k^*$, the input OGM $o_k$ and the motion-flow $\mu_k$, respectively. The encoders 128a, 128b, 128c may be implemented using the encoder 128 shown in FIG. 1A, or may be implemented using separate encoder units. For simplicity, the present disclosure will refer to a single encoder 128, however this is not intended to be limiting. In the disclosed OGM prediction system 120a, the encoder 128 may be implemented as a series of convolution layers, followed by pooling operations. The encoder 128 serves to extract features and also reduce dimensionality (e.g., x and y dimensions, in the case of 2D OGMs). FIG. 5 is a conceptual representation of how the encoder 128 may reduce the dimensionality of input data 502, in this case 2D data. It should be understood that similar operations may be performed to reduce the dimensionality of 3D data. In this example, the input data 502 has x and y dimensions $X_{input}$ and $Y_{input}$, respectively, and a relatively shallow depth (e.g., 1-3 channels). The encoder 128 in this example implements three convolutional layers each followed by a max pooling layer, depicted by the dotted lines 510a, 510b, 510c (generally referred to as step 510). At each step 510, the convolution layer increases depth by adding features (using feature extraction) and the max pooling operator reduces the x and y dimensions. The output data 504 from the encoder 128 has x and y dimensions $X_{code}$ and $Y_{code}$, respectively, and greater depth than the input data 502.

Reference is again made to FIG. 3. The encoder 128 may be configured to provide features with any suitable output dimensions and depth. However, all of the encoder outputs (i.e., $f_k^m$, $f_k^p$ and $f_k^o$) should have the same x and y dimensions (although the depths may be different). Because the inputs to be encoded (namely, the reference map $M_k^*$, the input OGM $o_k$ and the motion-flow $\mu_k$) may have different depths and possibly different dimensionality, it may be useful to have separate encoders 128a, 128b, 128c to encode each input differently, in order to obtain $f_k^m$, $f_k^p$ and $f_k^o$ that have the same x and y dimensions.

Reducing of the dimensionality of all the features $f_k^m$, $f_k^o$, $f_k^p$ may be useful to reduce the amount of data that is input to the RNN 122, in order to speed up computations. In some examples, where speed of computation is not a concern (e.g., where real-time predictions are not required) or where processing power is sufficiently high, it may not be necessary to reduce the dimensionality of the features $f_k^m$, $f_k^o$, $f_k^p$ extracted from the reference map $M_k^*$, the input OGM $o_k$ and the motion-flow $\mu_k$, respectively that are input to the RNN 122 (except to ensure that the features $f_k^m$, $f_k^p$ and $f_k^o$ have the same x and y dimensions).

The features $f_k^m$, $f_k^p$ and $f_k^o$ are then stacked using a concatenation operation 306, to form a stacked feature tensor having depth equal to the sum of the depths of the features $f_k^m$, $f_k^p$ and $f_k^o$. The stacked feature tensor is inputted to the RNN 122. As mentioned above, the RNN may be any suitable RNN. Examples of suitable RNNs include the RNN described by Kolen et al. (*A Field Guide to Dynamical Recurrent Networks*, s.1, John Wiley & Songs, 2001), a RNN using LSTM cells (or multi-layers) as described by Hochreiter et al. ("Long short-term memory", *Neural computation*, 1997, Vol. 8), or a RNN using gate-recurrent cells as described by Cho et al. ("On the properties of neural machine translation: Encoder-decoder approaches", arXiv preprint arXiv:1409.1259, 2014), among others.

Because the encoder 128 reduces the dimensionality of the features $f_k^m$, $f_k^p$ and $f_k^o$ input to the RNN 122, the output from the RNN 122 (e.g., the predicted corrective term $\Delta o_k$) also has reduced dimensionality. The decoder 129 is used to increase the dimensionality of the output from the RNN 122 (e.g., the predicted corrective term $\Delta o_k$). In the case where the encoder 128 was not used to reduce dimensionality of the of the features $f_k^m$, $f_k^p$ and $f_k^o$ input to the RNN 122, the decoder 129 may be omitted from the OGM prediction system 10. Generally the decoder 129 performs the opposite of the encoder 128, by increasing the dimensionality and optionally reducing the depth. The decoder 129 may perform such operations using transposed convolution layers (also referred to as deconvolution layers) and max pooling layers. For example the decoder 129 may apply deconvolution layers, transposed from the convolution layers of the encoder 128, in the reverse order as in the encoder 128.

The use of the encoder 128 together with the decoder 129 may be referred to as an encoder/decoder architecture. The encoder 128 may be considered to be performing downsampling of the features. The decoder 129 may be considered as performing upsampling of the output the RNN 122 (e.g., the predicted corrective term $\Delta o_k$), to increase the dimensionality of the output the RNN 122 (e.g., the predicted corrective term $\Delta o_k$) back to the original dimensions of the input OGM $o_k$.

The output of the decoder 129 is the corrective term $\Delta o_k$. During the observation phase, where the input OGM $o_k$ is the observed OGM $o_k^*$, conceptually speaking the RNN 122 may be initialized or prepared for prediction during the initialization phase. During the initialization phase, the OGM prediction system 120a generates a predicted OGM for the next time step (also referred to as "one-step-ahead" prediction). The RNN 122 of the OGM prediction system 120a generates a predicted corrective term $\Delta o_k$, and the decoder 129 increases the dimensionality of the predicted corrective term $\Delta o_k$. The predicted corrective term $\Delta o_k$ is then added to the input OGM $o_k$ to provide a corrected OGM $\hat{o}_{k+1}$ for the next time step which is provided to the OGM classifier 126 for performing classification of the corrected OGM $\hat{o}_{k+1}$ to generate a predicted OGM for the next time step. The corrective term $\Delta o_k$ is important during the prediction phase. Notably, unlike other approaches to generating predicted OGMs, the disclosed OGM prediction system 120a makes a prediction of how the OGM will change (represented by the corrective term $\Delta o_k$), rather than predicting the entire future OGM, which is used to generate a predicted OGM as described below. It has been found that using the OGM prediction system 120a achieves more accurate predicted OGMs and generates predicted OGMs more efficiently (e.g., in less time) than prior art systems.

The corrective term $\Delta o_k$ is summed with the input OGM $o_k$ to provide the corrected OGM $\hat{o}_{k+1}$ for the next time step, which is the input to the OGM classifier 126. Generally, the corrective term $\Delta o_k$ has dimensions that are the same as the input OGM $o_k$. In the case where the input OGM $o_k$ is ideal (i.e., it contains entries of 0 s and 1 s), the elements (also referred to as corrective elements) of the corrective term $\Delta o_k$ can be −1, 0 or 1. A 0 corrective element means that the corresponding cell of the predicted OGM (at time step k+1) is the exact same to the input OGM (at time step k). Such a cell may correspond to a free area, or an area occupied by a static object. However, around dynamic objects, the occupancy of the cells change. The pattern of the change depends on how the dynamic object is moving. Therefore, the corrective elements corresponding to a dynamic object, can have −1, 0 or 1 values, where a −1 value means that occupancy has changed from 1 to 0 (i.e., the cell changes from occupied to unoccupied), a 0 value means the occupancy of the cell is unchanged, and a 1 value means that occupancy has changed from 0 to 1 (i.e., the cell changes from unoccupied to occupied).

The predicted OGM $\tilde{o}_k$ represents probabilities of cell occupancy. Assuming that cell occupancy distributions are logistic, then during the prediction phase the input OGM $o_k$ has values between 0 and 1. The corrective term $\Delta o_k$ is generated by the decoder 129, whose output may employs the tanh( ) activation function to produce values between −1 and 1. Therefore, the resulting corrected OGM $\hat{o}_{k+1}$, which is the sum of the corrective term $\Delta o_k$ and the input OGM $o_k$, contains values between −1 and 2. This value range does not represent probability distributions over the cells anymore, but merely features that correspond to the occupancy of the cells.

In order to generate the predicted OGM $\tilde{o}_{k+1}$ that contains values representing occupancy probability at the next time step, the OGM classifier 126 is used. In some embodiments, the OGM classifier 126 is a machine learning module that includes another neural network (e.g., another RNN) that has been trained to learn to generate a predicted OGM $\tilde{o}_{k+1}$ that contains values representing occupancy probability at the next time step from a corrected OGM $\hat{o}_{k+1}$. The neural network of the OGM classifier 126 is trained to using training dataset comprising corrected OGMs $\hat{o}_{k+1}$ to learn generate predicted OGMs $\tilde{o}_{k+1}$. The training of the neural network using the training dataset involves adjusting the parameters (e.g., the weights and biases) of the neural network until a loss function is optimized. In alternative embodiments, the OGM classifier 126 may be any suitable machine learning module that uses a machine learning algorithm to learn to generate a predicted OGM $\tilde{o}_{k+1}$ that contains values representing occupancy probability at the next time step from a corrected OGM $\hat{o}_{k+1}$. It may be noted that the OGM classifier 126 is applied to the corrected OGM $\hat{o}_{k+1}$ having the full OGM dimensionality rather than reduced dimensionality. Thus, the neural network include in the OGM classifier 126 is not a deep neural network in order to ensure that the predicted OGM $\tilde{o}_{k+1}$ is generated sufficiently fast, if real-time output is desired. Where real-time output is not needed, or where processing power is sufficiently high, this may not be a concern. Because most of the complex feature extraction has been carried out by the previous-described parts of the OGM prediction system 120a, a neural network comprising a convolution layer followed by a SoftMax function may suffice to correctly classify the corrected OGM $\hat{o}_{k+1}$ to generate the predicted OGM $\tilde{o}_{k+1}$.

Figure 3:
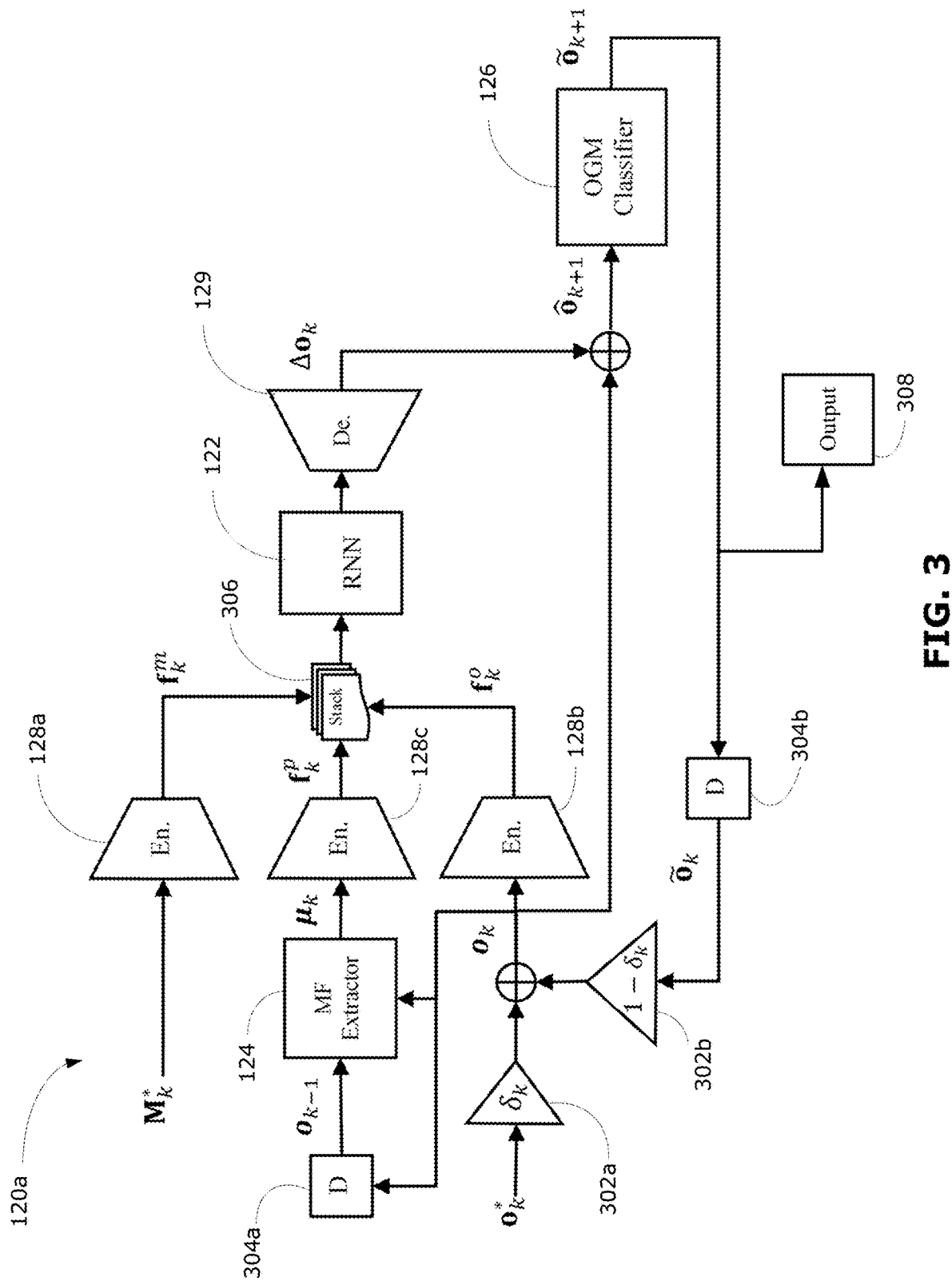
FIG. 3 is a block diagram illustrating an example of an OGM prediction system for generating predicted OGMs.

As shown in FIG. 3, during the prediction phase, the predicted OGM $\tilde{o}_{k+1}$ is fed back (via the delay block 304b) and used as the input OGM for the next time step. The output of the OGM prediction system 120a may be a set of OGMs over all time steps in the moving window (e.g., a predetermined time period an instance in time that moves over time). In an example where the moving window has 10 time steps (k=0, . . . , 9) in the observation phase and 10 time steps (k=10, . . . , 19) in the predictions phase, the output is the set of observed OGMs for 10 previous time steps, together with the set of predicted OGMs for the next 10 future time steps. As discussed previously, the output is generated at each run of the OGM prediction system 120a. One run of the OGM prediction system 120a iterates through all the time steps of the moving window, outputting one OGM at each time step and storing each predicted OGM into the output buffer 308 until iterations through the moving window have completed. Then the set of predicted OGMs stored in the output buffer 308 may be provided as a single output of the OGM prediction system 120a. When the OGM prediction system 120a is used to generate real-time predictions, one run of the OGM prediction system 120a, including iterations through multiple time steps in the moving window, may take place within the time period of a single real-time observation. In an autonomous vehicle, such as the vehicle 100, the output may be provided to a path planning system, such as path planning system 130, for path planning in real-time.

For implementation of the OGM prediction system 120 in a moving system (e.g., in an autonomous vehicle), the ego motion of the sensors (generally referred to as ego motion of the vehicle, in the case where the sensors are onboard a moving vehicle) should be considered, since this directly affects the observed OGMs. Various approaches can be used to address ego motion. One approach is to determine a proper state transformation inside the RNN 122, such as described by Dequaire et al., noted above. Another approach is to preprocess the observed OGMs, using motion information, outside of the OGM prediction system 120*a*. For example, motion information may be obtained from sensors (e.g., accelerometer, GPS sensor or speedometer, among others) and used to adjust the observed OGMs to take into account ego motion. Using this approach, from the perspective of the OGM prediction system 120*a*, the OGMs are observed (and predicted) for a stationary vehicle. Preprocessing to account for ego motion may be more effective. Also, the preprocessing approach (rather than determining the state transformation inside the RNN) means that the predictions are generated based on the current ego vehicle state. Such prediction may provide more flexibility for a planning algorithm to plan a proper trajectory for the vehicle.

Figure 6:
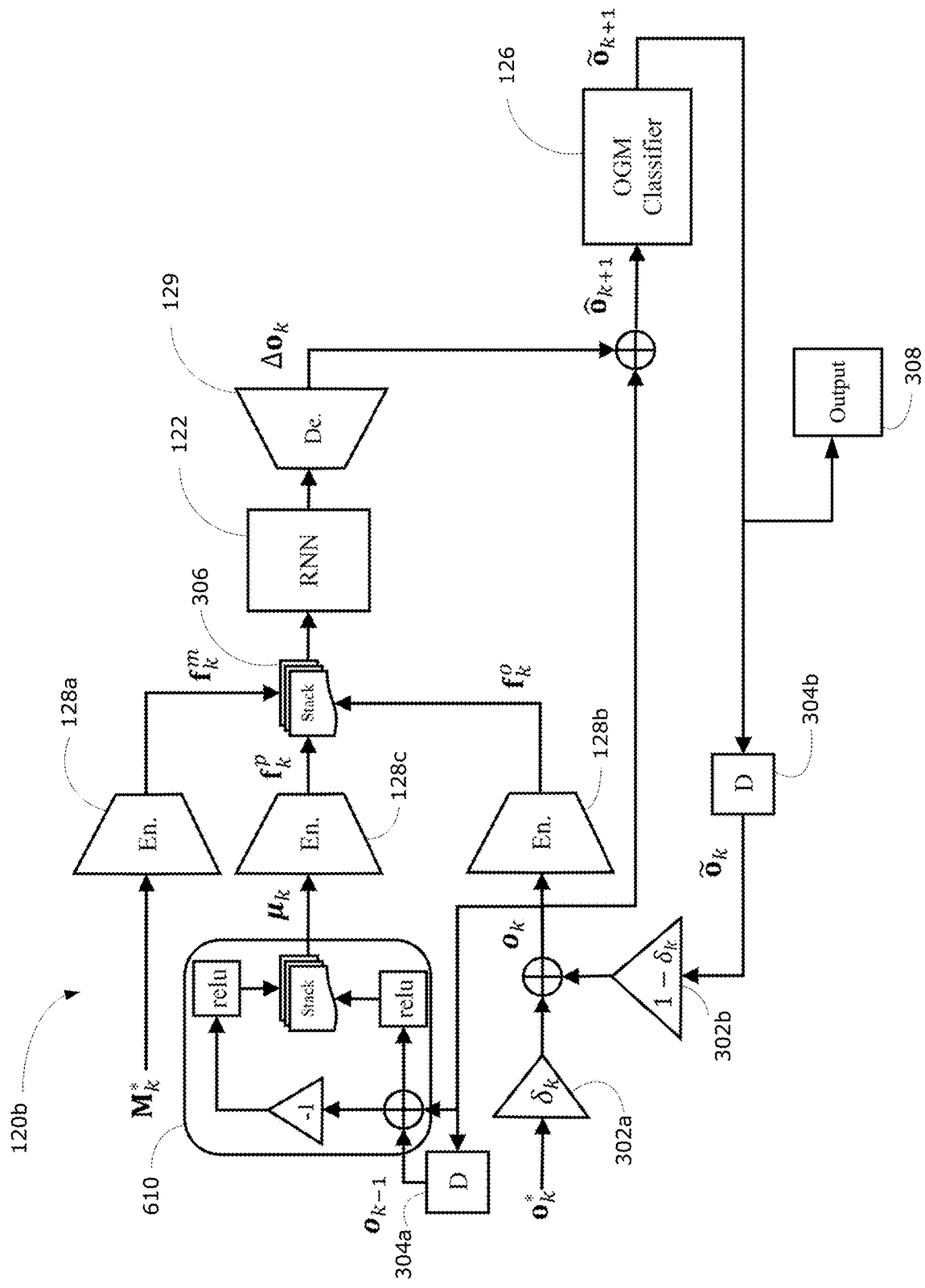
FIG. 6 is a block diagram illustrating another example OGM prediction system for generating predicted OGMs.

FIG. 6 is a block diagram illustrating another example disclosed OGM prediction system 120*b*. The example OGM prediction system 120*b* includes the RNN 122, the OGM classifier 126, the encoders 128*a*, 128*b*, 128*c*, the decoder 129, the selectors 302*a*, 302*b*, the delay blocks 304*a*, 304*b*, the concatenation operation 306, the stack 406, and the output buffer 308 of the OGM prediction system 120*a* of FIG. 3. Only the differences will be discussed in detail.

In the example OGM prediction system 120*b* includes a difference unit 610 rather than the MF extractor 124 (FIG. 3). The difference unit 610 calculates the difference between the input OGM $o_k$ and also the immediately previous input OGM $o_{k-1}$. The difference unit 610 in this example uses rectified linear units (relu), however other activation functions may be used as appropriate. In this way, the motion-flow $\mu_k$ may be determined by calculating the two-channel difference between two OGMs $o_k$ and $o_{k-1}$.

The use of the difference unit 610 in place of the MF extractor 124 (FIG. 3) in the OGM prediction system 120*b* may help to reduce the computational complexity and demand on processing resources. This may be useful for real-time implementation of the OGM prediction system 120*b*. It has been found that the OGM prediction system 120*b* provides predictions with accuracy similar to that of the OGM prediction system 120*a*. It should be noted that the motion-flow $\mu_k$ outputted from the difference unit 610 is not equivalent, strictly speaking, to the motion-flow outputted by the MF extractor 124. The encoder 128*c* may be designed to extract features similar to motion-flow features, however other types of features may be extracted. Regardless, the output of the difference unit 610 may provide sufficient motion information, in order to generate sufficiently accurate predictions.

Figure 7:
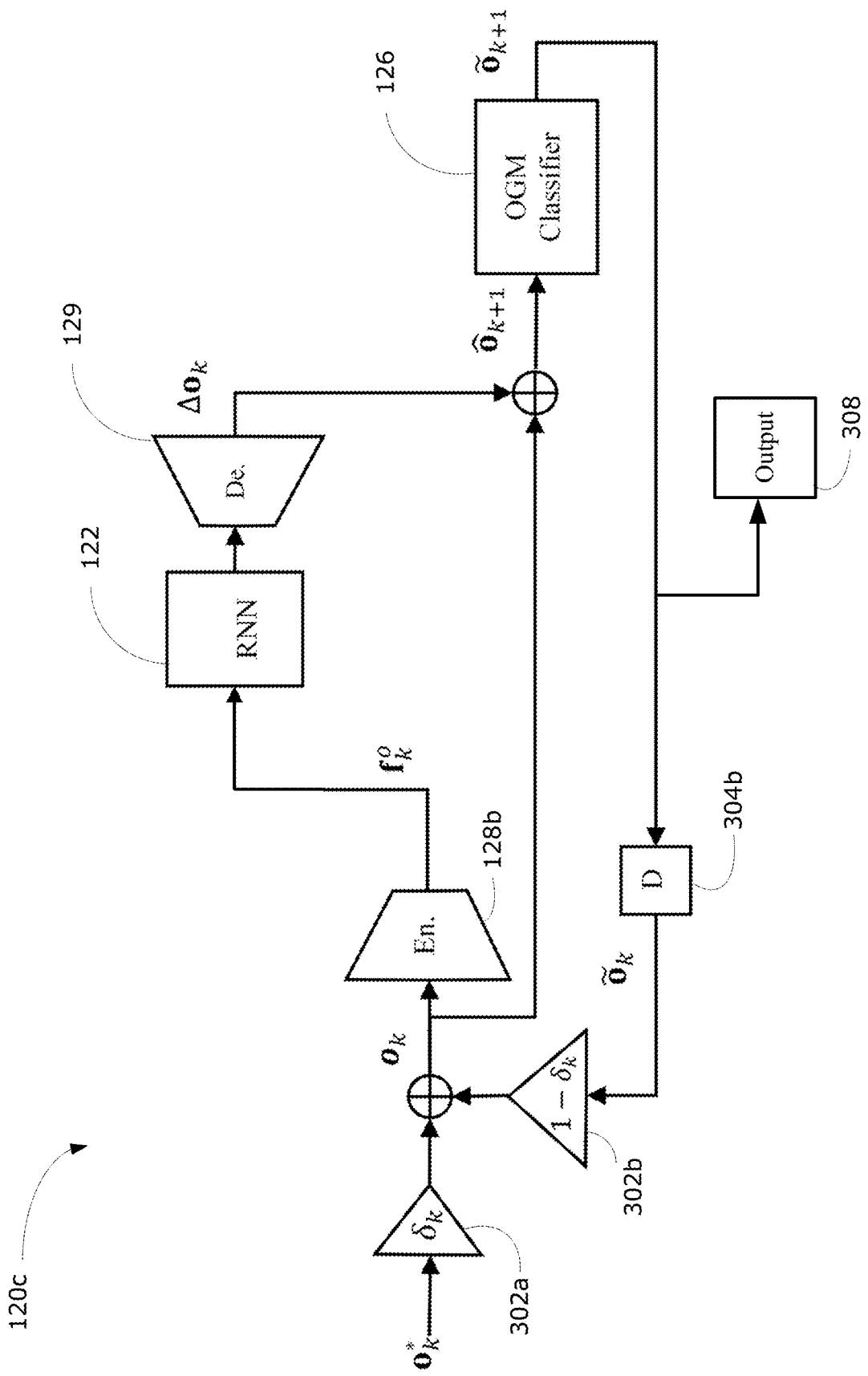
FIG. 7 is a block diagram illustrating another example of an OGM prediction system for generating predicted OGMs.

FIG. 7 is a block diagram illustrating another example disclosed OGM prediction system 120*c*. The OGM prediction system 120*c* may represent a simplified or bare-bones variation of the disclosed OGM prediction system 120. The example OGM prediction system 120*c* includes the RNN 122, the OGM classifier 126, the encoder 128*b*, the decoder 129, the selectors 302*a*, 302*b*, the delay block 304*b*, and the output buffer 308 of the OGM prediction system 120*a* of FIG. 3. Only the differences will be discussed in detail. In the example OGM prediction system 120*c*, the RNN 122 receives as input only features $f_k^o$ extracted from the input OGM $o_k$. The OGM prediction system 120*c* does not make use of motion-flow information or reference map features. The omission of the motion-flow information and reference map features may help to speed up processing and/or reduce use of processing resources. When the RNN 122 is trained using a sufficiently comprehensive training dataset, the OGM prediction system 120*c* may achieve accuracy in prediction similar to the OGM prediction system 120*a* of FIG. 3. Accuracy can be evaluated using a variety of measures, such as percentage of True Positives and True Negatives, Structural Similarity Index, etc.

The disclosed OGM prediction system 120*c* may be referred to as a difference learning system. Conceptually, the disclosed OGM prediction system 120*c* includes a difference learning module that generates the corrective term (also referred to as a compensation matrix), and a classifier module. The difference learning module includes the RNN 122, and may optionally include the encoder 128*b* and the decoder 129. The classifier module includes the OGM classifier 126 which receives the summation of the corrective term and the input OGM and generates a predicted OGM as described above.

The difference learning module may implicitly distinguish between static and dynamic objects, which is reflected in the corrective term. As discussed above, the elements of the corrective term are typically real values in the range of −1 to 1. A value equal to or near zero corresponds to a cell whose occupancy should not be altered (a free cell or a cell occupied by a static object). Similarly, a value closer to 1 (or −1) represents adding (or clearing) occupancy to (or from) the corresponding cell, indicating the cell is occupied by (or being freed from) a dynamic object.

The classifier module refines the corrected OGM further to generate the next predicted OGM. As discussed above, the classifier module includes the OGM classifier 126 may be implemented using a neural network, a simple feed-forward network, or an RNN, among other possibilities.

In general, the prediction accuracy of the disclosed OGM predication system 120 may benefit from having motion-flow information and/or reference map features, in the situation where the training dataset used to train the RNN includes only a limited number of training samples (e.g., labeled OGMs).

In an example, the disclosed OGM prediction system 120 may take into account reference map features, without making use of motion-flow information. In such an embodiment, the OGM prediction system 120 may omit the motion-flow path (including blocks 304*a*, 124 and 128*c*) from the system illustrated in FIG. 3. The prediction may then be performed based on reference map features $f_k^m$ stacked with OGM features $f_k^o$.

In another example, the disclosed OGM prediction system 120 may take into account motion-flow information, without making use of reference map features. In such an embodiment, the disclosed OGM prediction system 120 may omit the reference map path (including block 128*a*) from the system illustrated in FIG. 3, or from the system illustrated in FIG. 6. The prediction may then be performed based on motion-flow features $f_k^p$ stacked with OGM features $f_k^o$.

In another example, one or both of the reference map features $f_k^m$ or the motion-flow features $f_k^p$ may be provided from an external source. That is, one or both of the reference map path or the motion-flow path may be external to the system. For example, it may be fairly straightforward to implement the reference map path externally, for example by preprocessing the reference map using an external encoder. Because the reference map is expected to be relatively static, the reference map features $f_k^m$ may be extracted ahead of time and still be valid even for generating real-time predictions.

In the disclosed systems, any machine learning-based algorithm may be used in place of the RNN 122. When an RNN is used to generate the predictions, the RNN may be any suitable RNN architecture, including RNNs with or without state-transformations.

In the disclosed OGM prediction systems 120*a*, 120*b*, 120*c*, the OGM classifier 126 may be include a trained neural network, or a support vector machine (SVM) for performing classification of corrected OGMs as described above.

The disclosed OGM prediction system 120 has been described as outputting a set of OGMs, including at least one observed OGM and at least one predicted OGM. In other examples, the disclosed OGM prediction system 120 may output only predicted OGM(s). For example, the OGM prediction system 120 may only need to output predicted OGM(s) for one or more future time steps, because the observed OGM(s) for the current time step (and possibly one or more previous time steps) may already be stored in memory.

Figure 8:
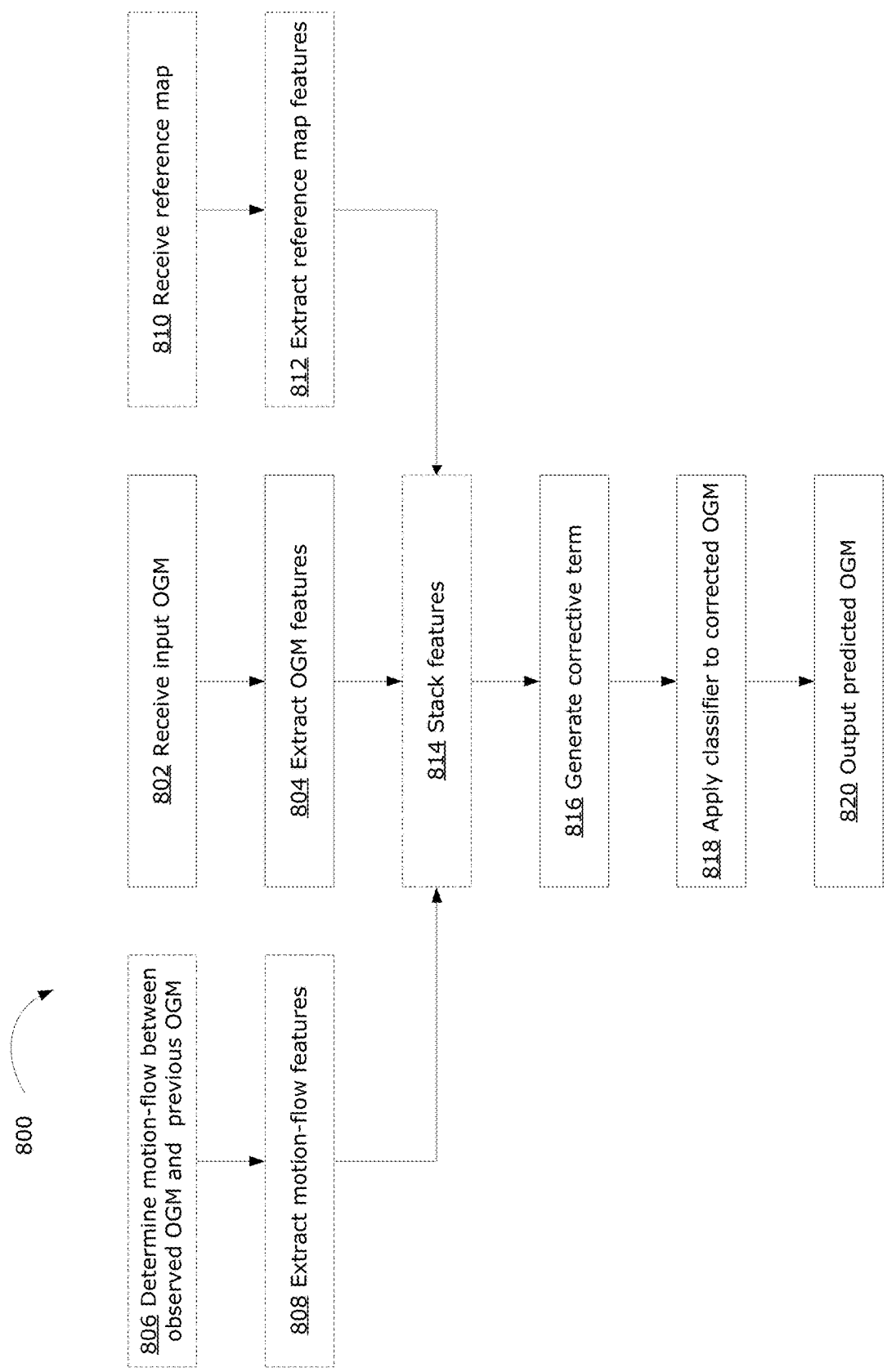
FIG. 8 is a flowchart illustrating an example method for generating predicted OGMs.

FIG. 8 is a flowchart illustrating an example method 800 for generating predicted OGMs, which may be performed using any of the example OGM prediction systems 120*a*, 120*b*, 120*c* discussed above. Although the disclosed OGM prediction systems operate in a recurrent fashion, the method 800 is described with respect to a single iteration of the OGM prediction systems 120*a*, 120*b*, 120*c*, for simplicity. Specifically, the example method 800 is described with respect to generation of a predicted OGM for a next time step in a defined time period based on an input OGM for a current time step in the defined time period. As discussed above, the input OGM may be an observed OGM for the current time step or a previously-predicted OGM for the current time step.

At action 802, an input OGM is received for a current time step. When the OGM prediction system 120 is operating in the initialization phase, the input OGM is an observed OGM for the current time step that may be received from the OGM generator 121 of the sensor system 110 of autonomous vehicle 100. The OGM generator 121 generates the observed OGM for the current time step based on sensor data received from the sensing units 112, 114, 116, 118 of the sensor system 110 of autonomous vehicle 100. Alternatively, an observed OGM may have been previously stored in a buffer or a database and received from the buffer or the database (e.g., for offline predictions, not in real-time). When the OGM prediction system 120 is operating in the prediction phase, the input OGM is a previously-predicted OGM (e.g., a predicted OGM previously generated by the OGM prediction system 120 for the current time step).

At action 804, OGM features are extracted from the input OGM, for example using encoder 128*b*, as discussed above. The OGM features may be extracted to a desired depth. In some examples, extracting OGM features may also include changing the dimensionality, as discussed above.

At action 806, optionally, motion-flow may be determined between the input OGM at the current time step, and a previous OGM from an immediately previous time step. Motion-flow may be determined using a motion-flow extractor (which may be any suitable classical motion-flow extractor, or a machine learning-module), or an approximation of motion-flow may be determined by calculating a difference between the input OGM and the previous OGM.

At action 808, optionally, motion-flow features are extracted, for example using encoder 128*c*, as discussed above. The motion-flow features may be extracted to a desired depth, which may be different from the depth of the OGM features. In some examples, extracting motion-flow features may also include changing the dimensionality to match the dimensionality of the OGM features, as discussed above.

Actions 806 and 808 may be dependent on each other, and together may be referred to as the motion-flow path.

At action 810, optionally, a reference map is received. The reference map may be received from the sensor system 110, an external database, or may be previously stored and received from an internal memory, for example.

At action 812, optionally, reference map features are extracted, for example using encoder 128*a*, as discussed above. The reference map features may be extracted to a desired depth, which may be different from the depth of the OGM and motion-flow features. In some examples, extracting reference map features may also include changing the dimensionality to match the dimensionality of the OGM features, as discussed above.

Actions 810 and 812 may be dependent on each other, and together may be referred to as the reference map path. In some examples, instead of performing optional actions 810 and 812, a single optional step of receiving reference map features (e.g., previously extracted reference map features) may be performed.

If the motion-flow path and/or the reference map path is performed, then at action 814 the OGM features may be stacked (e.g., concatenated) with the optional motion-flow features and/or reference map features.

At action 816, the features are inputted to the RNN 122 and the RNN 122 generates a corrective term based on the features. In some embodiments, the corrective term may require resizing in order to match the dimensionality of the input OGM, as discussed above. The corrective term is used to correct the input OGM (which was received at 802), in order to obtain a corrected OGM for a next future time step in the defined time period.

At action 818, the corrected OGM is input into the OGM classifier which generates a predicted OGM for the next time step in the defined time period.

At action 820, the predicted OGM is outputted. The predicted OGM may be outputted as part of a set of OGMs, including one or more historical observed OGMs and predicted OGMs. The outputted OGM may be outputted to be stored for future use (e.g., for path planning purposes).

In various examples, the present disclosure describes methods and systems for performing predictions which are used to generate predicted OGMs. The disclosed methods and systems may be implemented for performing real-time predictions that are used to generate real-time predicted OGMs, which may be useful for real-time path planning, for example in an autonomous vehicle. The disclosed methods and systems may also be implemented outside of autonomous vehicles, for example, in a processing unit such as processing unit 170, and may be used for generating predictions not in real-time.

In some examples, information from a reference map is used. The reference map information may include information about how likely various objects may appear in the OGM. Incorporating such a priori knowledge may help to improve the accuracy of the predicted OGMs.

In some examples, information about motion-flow in the OGM is used. Motion-flow may be extracted using any suitable motion-flow extractor, or may be approximated (e.g., by calculating a difference between a current and a preceding OGM). Incorporating motion-flow information may also help to improve the accuracy of OGM predictions.

The disclosed system employs prior knowledge about how the environment looks like (from an OGM point of view) by incorporating the input OGM as a basis for generating predicted OGMs. Rather than generating a predicted OGM from features only, the disclosed OGM prediction system generates a prediction of a corrective term for a time step, based on an input OGM. The input OGM may be a current OGM or an observed OGM generated from historical, observed sensor data (e.g., observations), and adds the corrective term to the input OGM to generate corrected OGM, which is then provided to an OGM classifier to generate a predicted OGM for a future time step. This approach helps to improve the accuracy of the predicted OGM with respect to known methods for generating predicted OGMs.

Various conventional approaches for tracking and OGM prediction require prior object detection and classification. In the present disclosure, the disclosed OGM prediction system 120 generates predicted OGMs using historical observed OGMs generated from sensor data, without need for prior object detection and classification. Hence, a training dataset comprising labeled OGMs is not necessary for training the OGM prediction system 120. A labeled OGM is an OGM in which different parts of the OGM are labeled as different objects, such as cars, pedestrians, trees, etc.

The use of encoders and decoders, in some examples, may enable high resolution OGMs to be processed in real-time, using currently available processing capabilities.

The disclosed OGM prediction system 120 may be implemented using any suitable machine learning-based architecture, including any suitable neural network architectures (including any suitable RNN).

In some example aspects, the present disclosure describes a machine learning-based system for generating a predicted occupancy grid map (OGM) over at least one future time step. The system includes a first encoder for extracting OGM features from an input OGM, the input OGM representing occupancy of a sensed environment, in a current time step. The machine learning-based system also includes a recurrent neural network for generating a corrective term from at least the OGM features, wherein the corrective term represents a predicted change to the input OGM, and wherein the corrective term is applied to the input OGM to generate a corrected OGM, the corrected OGM representing features corresponding to occupancy of the environment in a first future time step. The system also includes a classifier for converting the corrected OGM to the predicted OGM, the predicted OGM representing occupancy of the environment in the first future time step. The predicted OGM is fed back as the input OGM to the first encoder and is used for generating a predicted OGM for a second future time step.

In any of the above aspects, the first encoder may include one or more convolution and pooling layers for extracting the OGM features. The machine learning-based system may also include: a decoder including one or more deconvolution layers corresponding to transpositions of the one or more convolution and pooling layers of the first encoder, wherein the decoder converts output from the recurrent neural network to the corrective term.

In any of the above aspects, the system may also include: a second encoder for extracting reference map features from a reference map, the reference map representing a priori information about the sensed environment, wherein the recurrent neural network is configured to generate the corrective term from at least the OGM features and the reference map features.

In any of the above aspects, the system may also include: a motion-flow extractor for determining motion-flow between the input OGM and a previous OGM representing occupancy in a previous time step; and a third encoder for extracting motion-flow features from the motion-flow; wherein the predictive neural network is configured to generate the corrective term from at least the OGM features and the motion-flow features.

In any of the above aspects, the motion-flow extractor may include a neural network.

In any of the above aspects, the system may also include: a difference unit for calculating a difference between the input OGM and a previous OGM representing occupancy in a previous time step; and a third encoder for extracting motion-flow features from the difference; wherein the recurrent neural network is configured to generate the corrective term from at least the OGM features and the motion-flow features.

In any of the above aspects, the system may also include: a selector for selecting between an observed OGM and a previously-predicted OGM to use as the input OGM, wherein the selector is configured to select the observed OGM during an observation phase of the system, and to select the previously-predicted OGM during a prediction phase of the system.

In any of the above aspects, the system may also include: an output buffer for storing a set of OGMs including at least the input OGM and the predicted OGM, wherein output provided by the system is the set of OGMs.

In any of the above, the system may also include: a sensor system comprising one or more sensors for obtaining data about the sensed environment, the data from the sensor system being used for generating the input OGM for at least one time step; and a path planning system receiving at least the predicted OGM, the path planning system using at least the predicted OGM to determine a planned path.

In any of the above, the system may be implemented in an autonomous vehicle.

In some aspects, the present disclosure describes a method for generating a predicted occupancy grid map (OGM) for at least one future time step. The method includes receiving an input OGM. The method also includes extracting OGM features from the input OGM. The method also includes applying a recurrent neural network to at least the OGM features to generate a corrective term, wherein the corrective term represents a predicted change to the input OGM, and wherein the corrective term is applied to the input OGM to generate a corrected OGM, the corrected OGM representing features corresponding to occupancy of the environment in a first future time step. The method also includes applying a classifier to convert the corrected OGM to the predicted OGM, the predicted OGM representing occupancy of the environment in the first future time step. The method also includes outputting at least the predicted OGM.

In any of the above aspects, the predicted OGM may be fed back as input for performing OGM prediction for a second future time step.

In any of the above, extracting the OGM features may include: applying a first encoder to the input OGM, the first encoder including one or more convolution and pooling layers, the OGM features having different dimensionality than the input OGM; and applying a decoder to convert output from the recurrent neural network to the corrective term, the decoder including one or more deconvolution layers corresponding to transpositions of the one or more convolution and pooling layers of the first encoder.

In any of the above, the method may also include: receiving reference map features, representing a priori information about the sensed environment; wherein the predictive neural network is applied to at least the OGM features and the reference map features.

In any of the above aspects, receiving the reference map features may include: receiving a reference map representing the sensed environment; and applying a second encoder to the reference map to extract the reference map features from the reference map.

In any of the above aspects, the method may also include: determining motion-flow between the input OGM and a previous OGM representing occupancy in a previous time step; and applying a third encoder to the motion-flow to extract motion-flow features from the motion-flow; wherein the predictive neural network is applied to at least the OGM features and the motion-flow features.

In any of the above aspects, the method may also include: calculating a difference between the input OGM and a previous OGM representing occupancy in a previous time step; and applying a third encoder to the difference to extract motion-flow features from the difference; wherein the predictive neural network is applied to at least the OGM features and the motion-flow features.

In any of the above aspects, the method may also include: in an observation phase, selecting an observed OGM as the input OGM; and in a prediction phase, selecting a previously-predicted OGM as the input OGM.

In any of the above aspects, outputting at least the predicted OGM may include outputting a set of OGMs including at least one observed OGM and at least one predicted OGM.

Although the present disclosure describes methods and processes with steps in a certain order, one or more actions of the methods and processes may be omitted or altered as appropriate. One or more actions may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A system for generating predicted occupancy grid maps (OGMs) for an environment in which an autonomous vehicle is operating, the system comprising:
   a first encoder configured to receive, at each time step in a defined time period, an input OGM for a current time step in the defined time period the input OGM being one of an observed OGM for the current time step and a previously-predicted OGM for the current time step, the input OGM representing occupancy of the environment at the current time step using a plurality of cells, each cell containing a value representing occupancy of a corresponding portion of the environment at the current time step, wherein the first encoder extracts features from the input OGM using at least one convolution layer in response to receipt of the input OGM, and the first encoder reduces dimensionality of the extracted features using at least one max pooling operator to output OGM features having reduced dimensionality compared to dimensionality of the input OGM;
   a recurrent neural network configured to receive the OGM features having reduced dimensionality compared to the dimensionality of the input OGM, wherein the recurrent neural network predicts, in response to receipt of the OGM features, a predicted change term at each time step in the defined time period based on the OGM features, the predicted change term being predicted using at least one neural network layer that is a gated recurrent unit (GRU) or a long-short-term memory (LSTM) layer, wherein the predicted change term represents predicted change to the input OGM;
   a decoder configured to increase dimensionality of the predicted change term to match the dimensionality of the input OGM, in response to receipt of the predicted change term from the recurrent neural network, using at least one deconvolution layer that is a transpose of the at least one convolution layer of the encoder;
   a summation operator configured to generate a changed OGM for a next future time step in the defined time period in response to receipt of the predicted change term and receipt of the input OGM, the summation operator generating the changed OGM by summing the predicted change term with the input OGM, the changed OGM representing features corresponding to occupancy of the environment in the next future time step; and
   a classifier configured to receive the changed OGM, wherein the classifier converts the changed OGM to a predicted OGM, in response to receipt of the changed OGM, using at least one convolution layer followed by at least one softmax function, the predicted OGM representing predicted occupancy of the environment in the next future time step.

2. The system of claim 1, further comprising:
   a second encoder configured to extract reference map features from a reference map in response to receipt of the reference map, the reference map representing a priori information about the sensed environment;
   wherein the recurrent neural network is further configured to receive the reference map features from the second encoder and to predict at each time step in a defined time period, the predicted change term based on the OGM features and the reference map features.

3. The system of claim 1, further comprising:
a motion-flow extractor configured to determine motion-flow between the input OGM and a previous OGM representing occupancy in a previous time step using cells, each cell of the previous OGM containing a value representing occupancy of a corresponding portion of the environment at the previous time step, the motion-flow representing a change in cell occupancy from the previous OGM to the input OGM; and
a third encoder configured to receive the motion-flow from the motion-flow extractor, the third encoder extracting motion-flow features from the motion-flow in response to receipt of the motion-flow;
the recurrent neural network being configured to receive the motion-flow features from the third encoder and to predict, at each time step in the defined time period, the predicted change term from the OGM features and the motion-flow features.

4. The system of claim 2, further comprising:
a motion-flow extractor configured to determine motion-flow between the input OGM and a previous OGM representing occupancy in a previous time step using cells, each cell containing a value representing occupancy of a corresponding portion of the environment at the previous time step, wherein the motion-flow represents a change in cell occupancy from the previous OGM to the input OGM; and
a third encoder configured to receive the motion-flow from the motion-flow extractor, wherein the third encoder extracts motion-flow features from the motion-flow in response to receipt of the motion-flow;
the recurrent neural network being configured to receive the motion-flow features from the third encoder and to predict, at each time step in a defined time period, the predicted change term from the OGM features, the reference map features, and the motion-flow features.

5. The system of claim 1, further comprising:
a difference unit configured to calculate a difference between the input OGM and a previous input OGM representing occupancy of the sensed environment in a previous time step in the defined time period, the difference being calculated between each cell of the input OGM and a corresponding cell of the previous input OGM; and
a third encoder configured to receive the difference from the difference unit and to extract motion-flow features from the difference in response to receipt of the difference;
the recurrent neural network being configured to receive the motion-flow features from the third encoder and to predict, at each time step in a defined time period, the predicted change term based on the OGM features and the motion-flow features.

6. The system of claim 1, further comprising:
a selector configured to select between the observed OGM and the previously-predicted OGM to use as the input OGM for the current time step, the selector being configured to select the observed OGM during an initialization phase, and to select the previously-predicted OGM during a prediction phase.

7. The system of claim 1, further comprising:
an output buffer configured to store a set of OGMs including at least one of the input OGMs and the predicted OGMs, wherein output provided by the system is the set of OGMs.

8. The system of claim 1, further comprising:
a sensor system configured to:
receive sensor data about the sensed environment from one or more sensors; and
generate the observed OGM in response to receipt of the sensor data.

9. A method for generating predicted occupancy grid maps (OGMs) for an environment in which an autonomous vehicle is operating, the method comprising:
receiving, at each time step in a defined time period, an input OGM for a current time step in the defined time period, the input OGM being one of an observed OGM for the current time step and a previously-predicted OGM for the current time step, the input OGM representing occupancy of the environment at the current time step using a plurality of cells, each cell containing a value representing occupancy of a corresponding portion of the environment at the current time step;
extracting OGM features in response to receipt of the input OGM, the OGM features being extracted at each time step in the defined time period, the OGM features having reduced dimensionality compared to dimensionality of the input OGM;
predicting a predicted change term based on the OGM features in response extraction of the OGM features, the predicted change term being predicted at each time step in the defined time period, the predicted change term being predicted using a recurrent neural network having at least one neural network layer that is a gated recurrent unit or a long-short-term memory layer, the predicted change term representing a predicted change to the input OGM;
increasing dimensionality of the predicted change term, in response to prediction of the predicted change term, to match the dimensionality of the input OGM by processing the predicted change term using a decoder;
summing, at each time step in the defined time period, the predicted change term to with the input OGM to generate a changed OGM for a next future time step in the defined time period, the changed OGM representing features corresponding to occupancy of the environment for the next future time step;
converting the changed OGM for the next future time step to a predicted OGM for the next future time step, in response to generation of the changed OGM for the next future time step, using a classifier having a neural network including at least one convolution layer, the predicted OGM representing predicted occupancy of the environment for the next future time step; and
outputting the predicted OGM.

10. The method of claim 9, further comprising:
receiving reference map features, representing a priori information about the sensed environment;
wherein predicting comprises predicting, at each time step in the defined time period using the recurrent neural network, the predicted change term based on the OGM features and the reference map features.

11. The method of claim 10, wherein receiving the reference map features comprises:
receiving a reference map representing the sensed environment; and
extracting, in response to receiving the reference map, the reference map features from the reference map using a second encoder.

12. The method of claim 9, further comprising:
determining motion-flow between the input OGM and a previous OGM representing occupancy in a previous time step using cells, each cell of the previous OGM containing a value representing occupancy of a corresponding portion of the environment at the previous time step, the motion-flow representing a change in cell occupancy from the previous OGM to the input OGM; and extracting, using a third encoder, motion-flow features from the motion-flow;

wherein predicting comprises predicting, at each time step in a defined time period, the predicted change term using the recurrent neural network, based on the OGM features and the motion-flow features.

13. The method of claim 9, further comprising:
calculating a difference between the input OGM and a previous input OGM representing occupancy in a previous time step in the defined time period, the difference being calculated between each cell of the input OGM and a corresponding cell of the previous input OGM; and extracting, using a third encoder, motion-flow features from the difference;

wherein predicting comprises predicting, at each time step in the defined time period using the recurrent neural network, the predicted change term based on the OGM features and the motion-flow features.

14. The method of claim 9, further comprising:
in an initialization phase, selecting the observed OGM as the input OGM; and
in a prediction phase, selecting the previously-predicted OGM as the input OGM.

15. The method of claim 9, wherein outputting at least the predicted OGM comprises outputting a set of OGMs including at least one observed OGM and at least one predicted OGM.

16. A non-transitory computer-readable medium comprising computer readable instructions which, when executed by at least one processor of a computer, cause the computer to:
receive, at each time step in a defined time period, an input OGM for a current time step in the defined time period, the input OGM being one of an observed OGM for the current time step and a previously-predicted OGM for the current time step, the input OGM representing occupancy of the environment at the current time step using a plurality of cells, each cell containing a value representing occupancy of a corresponding portion of the environment at the current time step;
extract OGM features in response to receipt of the input OGM, the OGM features being extracted at each time step in the defined time period, the OGM features having reduced dimensionality compared to dimensionality of the input OGM;
predict a predicted change term based on the OGM features in response extraction of the OGM features, the predicted change term being predicted at each time step in the defined time period, the predicted change term being predicted using a recurrent neural network having at least one neural network layer that is a gated recurrent unit or a long-short-term memory layer, wherein the predicted change term represents a predicted change to the input OGM;
increase dimensionality of the predicted change term, in response to prediction of the predicted change term, to match the dimensionality of the input OGM by processing the predicted change term using a decoder;
sum, at each time step in the defined time period, the predicted change term with the input OGM to generate a changed OGM for a next future time step in the defined time period, the changed OGM representing features corresponding to occupancy of the environment for the next future time step;
convert the changed OGM for the next future time step to a predicted OGM for the next future time step, in response to generation of the changed OGM for the next future time step, using a classifier having a neural network including at least one convolution layer, the predicted OGM representing predicted occupancy of the environment for the next future time step; and
output the predicted OGM.

17. The method of claim 9, further comprising:
receiving sensor data about the sensed environment from one or more sensors; and
generating the observed OGM in response to receipt of the sensor data.

18. The non-transitory computer readable medium of claim 16, wherein the computer readable instructions further cause the computer to:
receive a reference map representing the sensed environment; and
extract reference map features from the reference map in response to receipt of the reference map, the reference map features being extracted using a second encoder, the reference map features representing a priori information about the sensed environment;
wherein predicting comprises predicting, at each time step in the defined time period using the recurrent neural network, the predicted change term based on the OGM features and the reference map features.

19. The non-transitory computer readable medium of claim 16, wherein the computer readable instructions further cause the computer to:
determine motion-flow between the input OGM and a previous OGM representing occupancy in a previous time step using cells, each cell of the previous OGM containing a value representing occupancy of a corresponding portion of the environment at the previous time step, the motion-flow representing a change in cell occupancy from the previous OGM to the input OGM; and
extract, using a third encoder, motion-flow features from the motion-flow;
wherein predicting comprises predicting, at each time step in a defined time period, the predicted change term using the recurrent neural network, based on the OGM features and the motion-flow features.

20. The non-transitory computer readable medium of claim 16, wherein the computer readable instructions further cause the computer to:
calculate a difference between the input OGM and a previous input OGM representing occupancy in a previous time step in the defined time period, the difference being calculated between each cell of the input OGM and a corresponding cell of the previous input OGM; and
extract, using a third encoder, motion-flow features from the difference;
wherein predicting comprises predicting, at each time step in the defined time period using the recurrent neural network, the predicted change term based on the OGM features and the motion-flow features.

* * * * *